(12) United States Patent  (10) Patent No.: US 8,620,270 B2
Ahmadvand et al.  (45) Date of Patent: Dec. 31, 2013

(54) SYSTEM AND METHOD PROVIDING INTEROPERABILITY BETWEEN CELLULAR AND OTHER WIRELESS SYSTEMS

(75) Inventors: Nima Ahmadvand, Ottawa (CA); Hanwu Hu, Ottawa (CA)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 213 days.

(21) Appl. No.: 12/816,130

(22) Filed: Jun. 15, 2010

(65) Prior Publication Data

US 2011/0081890 A1  Apr. 7, 2011

Related U.S. Application Data

(60) Provisional application No. 61/248,969, filed on Oct. 6, 2009.

(51) Int. Cl.
*H04M 1/66* (2006.01)
(52) U.S. Cl.
USPC ............ 455/411; 455/426.1; 455/422.1
(58) Field of Classification Search
USPC ............ 455/426, 422.1, 426.1, 426.2, 428, 455/436–445; 370/328–338
See application file for complete search history.

(56) References Cited

U.S. PATENT DOCUMENTS

| | | | |
|---|---|---|---|
| 7,454,207 B2 | 11/2008 | Gallagher et al. | |
| 2005/0286466 A1 | 12/2005 | Tagg et al. | |
| 2006/0002355 A1* | 1/2006 | Baek et al. | 370/338 |
| 2007/0008885 A1 | 1/2007 | Bonner | |
| 2007/0268888 A1 | 11/2007 | Shatzkamer et al. | |
| 2007/0268908 A1 | 11/2007 | Linkola et al. | |
| 2008/0002609 A1 | 1/2008 | Caldwell et al. | |
| 2008/0004009 A1 | 1/2008 | Caldwell et al. | |
| 2008/0220740 A1 | 9/2008 | Shatzkamer et al. | |
| 2009/0117874 A1 | 5/2009 | Ye et al. | |
| 2009/0137244 A1* | 5/2009 | Zhou et al. | 455/426.1 |
| 2009/0196265 A1* | 8/2009 | Mariblanca Nieves et al. | 370/338 |
| 2009/0215429 A1* | 8/2009 | Caldwell et al. | 455/406 |

FOREIGN PATENT DOCUMENTS

| | | | |
|---|---|---|---|
| CA | 2619639 A1 | 4/2007 | |
| CA | 2619651 A1 | 11/2007 | |
| CA | 2665802 A1 | 1/2010 | |

OTHER PUBLICATIONS

International Search Report, PCT/CA2010/001570, mailed Jan. 19, 2011.

* cited by examiner

*Primary Examiner* — Chuong A Ngo
(74) *Attorney, Agent, or Firm* — Winstead PC

(57) ABSTRACT

A method and corresponding apparatus for providing a cellular subscriber with access to a WLAN are provided. They involve identifying a multimode mobile terminal, which corresponds to the subscriber and the WLAN from an access request. Based on the identification, the WLAN is authorized to provide the mobile terminal with access. The mobile terminal is then provided with access to the WLAN as a cellular subscriber and enables interoperability between the two networks. For example, the subscriber does not have to supply a credit card to pay for WLAN access directly. Instead, the subscriber pays a cellular network provider, and, in turn, the cellular network provider pays a WLAN provider for the access.

37 Claims, 24 Drawing Sheets

SYSTEM AND METHOD PROVIDING INTEROPERABILITY BETWEEN CELLULAR AND OTHER WIRELESS SYSTEMS

RELATED APPLICATION

This application claims the benefit of U.S. Provisional Application No. 61/248,969 filed on Oct. 6, 2009.

BACKGROUND OF THE INVENTION

Cellular networks, such as global systems for mobile communication (GSM) and general packet radio service (GPRS) mobile service networks, provide two-way voice and data communication with regional, national or international coverage. This makes mobile communication very convenient. These networks, however, use powerful base stations to communicate with mobile terminals making mobile communication expensive. An alternative to expensive cellular networks is wireless local area networks (WLANs), such as Wi-Fi (e.g., Institute of Electrical and Electronics Engineers (IEEE) 802.11). Unlicensed Mobile Access (UMA) technology provides seamless access to a cellular network over Wi-Fi or other unlicensed spectrum technologies.

A dual-mode enabled mobile terminal, such as a UMA-enabled mobile terminal, or a mobile phone or computer with cellular and wireless functions, can switch between a cellular network and a WLAN. However, it is typically limited to accessing a WLAN with free access, a WLAN supplied by the cellular network service provider or a WLAN with a known access code. For example, some service providers have installed WLANs, called hotspots, in public places, where their own subscribers are allowed to connect after paying for such service and entering an access code. Non-subscribers, however, cannot access these hotspots. Not only does this limit the number of locations of available service but in some cases, it results in networks being underused.

An important point to remember is that UMA takes care of the seamless connection of a dual-mode device from a cellular system to a WLAN, once the device is successfully associated with WLAN. For example, a user makes a voice call or a data connection by a dual-mode cellular handset over the cellular wireless network. When the user goes to an authorized hotspot area, the phone can switch to the WLAN, i.e., the hotspot. At this point, UMA ensures that the call can be continued over the WLAN seamlessly. However, UMA does not address how to access Wi-Fi networks, it just provides the seamless connection once the physical wireless connection is achieved, such as through successful association with a hotspot, a home or a free to public WLAN.

SUMMARY OF THE INVENTION

Non-limiting embodiments provide an apparatus, method, or system for providing a mobile terminal, which corresponds to a subscriber of a cellular network, with access to a Wireless Local Area Network (WLAN).

Prior to these embodiments, there has typically been no relationship between the cellular network and the wireless network. The cellular network and wireless network are managed by separate and independent entities. Further, the mobile terminal is not a subscriber to the wireless network. The disclosed embodiments establish a relationship among the mobile terminal, cellular network, and wireless network.

To establish the relationship and to provide the mobile terminal with access to the wireless network as a subscriber to the cellular network, a method, and corresponding apparatus, according to one embodiment of the present invention includes identifying a mobile terminal and a wireless local area network from a request by the mobile terminal for access to the wireless local area network. Based on the identifying, the embodiment authorizes the wireless local area network to provide the mobile terminal with access to the wireless local area network as a subscriber of the cellular network. The embodiment then provides the mobile terminal with access to the wireless local area network as authorized.

The request may be sent from the mobile terminal through the wireless local area network to the cellular network over, for example, a cellular radio connection, a wired network, or the Internet. In this case, a convenient embodiment identifies the mobile terminal from the request sent from the mobile terminal through the wireless local area network to the cellular network.

Alternatively, the request may be sent from the mobile terminal directly to the cellular network, for example, over a cellular radio connection. In this case, the cellular network may identify the wireless local area network from the request sent from the mobile terminal to the cellular network.

The request may include the identification of the mobile terminal and/or the subscriber corresponding to the mobile terminal. A convenient embodiment authenticates the identification submitted in the request.

The request may include a service set identifier (SSID) or other wireless local area network identification. Another embodiment identifies the wireless local area network based on the wireless local area network identification submitted in the request.

Yet another embodiment determines whether the wireless local area network and the cellular network are partners based on the wireless local area network identification.

The wireless local area network typically includes an access point and/or controller. The controller is usually responsible for at least one of authentication, authorization, or accounting for the wireless local area network. A convenient embodiment authorizes the access point of the wireless local area network to provide the mobile terminal with access to the wireless local area network. Another embodiment authorizes the controller of the wireless local area network to provide the mobile terminal with access to the wireless local area network.

The wireless local area network may be accessed (e.g., through an access point) using a password or key. A convenient embodiment sends the password to the mobile terminal through the cellular network. Another embodiment allows the mobile terminal to access the wireless local area network using a mobile terminal identifier (or an identifier of the subscriber corresponding to the mobile terminal) as the key.

In addition to the foregoing, a convenient embodiment, in response to the request from the mobile terminal, requests the mobile terminal to confirm the request. In response to the mobile terminal confirming the request, the embodiment then authorizes the wireless local area network to provide the mobile terminal with access to the wireless local area network.

Even though the foregoing enables the mobile terminal to access the wireless network without having to pay the wireless network, directly, the wireless network may still be paid for providing access. Another embodiment authorizes the wireless local area network to record an expense for providing the mobile terminal with access to the wireless local area network. The embodiment then bills an amount to the mobile terminal (or the corresponding subscriber) based on the recorded expense.

Some of the foregoing may be performed by the cellular network (e.g., by a cellular network node), the wireless network (e.g., by a wireless node), mobile terminal, or combination thereof.

Also, some of the foregoing may be carried by electronic processing in at least one electronic component or module.

In a cellular network embodiment, the cellular network identifies the mobile terminal and the wireless local area network from the request by the mobile terminal for access to the wireless local area network. Based on the identifying, the cellular network authorizes the wireless local area network to provide the mobile terminal with access to the wireless local area network as a subscriber of the cellular network. A corresponding cellular network node has an identifying module communicatively coupled to an authorizing module to perform the above.

Another cellular network node embodiment has a transceiver configured to transmit and receive cellular communications with the mobile terminal. It also has a processor communicatively coupled to the wireless local area network that is programmed to perform the above. The processor may be programmed accordingly using a computer readable program stored in a computer readable medium that is included in a computer program product.

In another cellular network embodiment, the cellular network provides cellular service from the cellular network to the mobile terminal. The cellular network provides authorization from the cellular network to a wireless local area network to enable communication between the wireless local area network and the mobile terminal.

In a wireless local area network embodiment, the wireless local area network receives authorization from the cellular network to provide the mobile terminal with access to the wireless local area network as a subscriber of the cellular network. The wireless local area network provides the mobile terminal with access to the wireless local area network as authorized. A corresponding wireless local area network node has a receiving module communicatively coupled to a providing module to perform the above.

Another wireless local area network node embodiment has a transceiver configured to transmit and receive wireless communications with the mobile terminal. It also has a processor communicatively coupled to the cellular network that is programmed to perform the above. The wireless local area network processor may be programmed accordingly using a computer readable program stored in a computer readable medium that is included in a computer program product.

In a mobile terminal embodiment, the mobile terminal requests access to the wireless local area network. The mobile terminal accesses the wireless local area network as a subscriber of the cellular network. A corresponding mobile terminal has a requesting module communicatively coupled to an accessing module to perform the above.

Another mobile terminal embodiment has a cellular transceiver configured to transmit and receive cellular communications and a wireless local area network transceiver configured to transmit and receive wireless communications. It also has a processor communicatively coupled to the cellular network and wireless local area network that is programmed to perform the above. The mobile terminal processor may be programmed accordingly using a computer readable program stored in a computer readable medium that is included in a computer program product.

In a cellular network and wireless local area network embodiment, the cellular network identifies the mobile terminal and the wireless local area network from a request by the mobile terminal for access to the wireless local area network. Based on the identifying, the cellular network authorizes the wireless local area network to provide the mobile terminal with access to the wireless local area network as a subscriber of the cellular network. The wireless local area network provides the mobile terminal with access to the wireless local area network as authorized.

In a cellular network and mobile terminal embodiment, the mobile terminal requests access to the wireless local area network. The cellular network identifies the mobile terminal and the wireless local area network from a request by the mobile terminal. Based on the identifying, the cellular network authorizes the wireless local area network to provide the mobile terminal with access to the wireless local area network as a subscriber of the cellular network. The mobile terminal accesses the wireless local area network.

Advantageously, the embodiments enable the use of potentially a large number of access points while addressing the charging options as well as the associated control method required.

Other non-limiting embodiments provide an apparatus, method, or system that enables the use of access points while addressing the charging options as well as the associated control methods required.

Yet more non-limiting embodiments provide an apparatus, method, or system that enable efficient interoperability between a cellular network and a UMA network in a dual-mode mobile device.

Beneficially, a seamless switch between cellular and WLAN networks is provided. Furthermore, UMA can be extended to all the access points that could accept new users.

Other non-limiting embodiments provide an apparatus, method, or system that enables efficient interoperability between a cellular system and a wireless local area network (WLAN) in a dual-mode mobile device. Using this technique. A seamless switch between cellular and WLAN networks is provided. Furthermore, the UMA can be extended to all the access points that can accept new users.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

Figure 1:
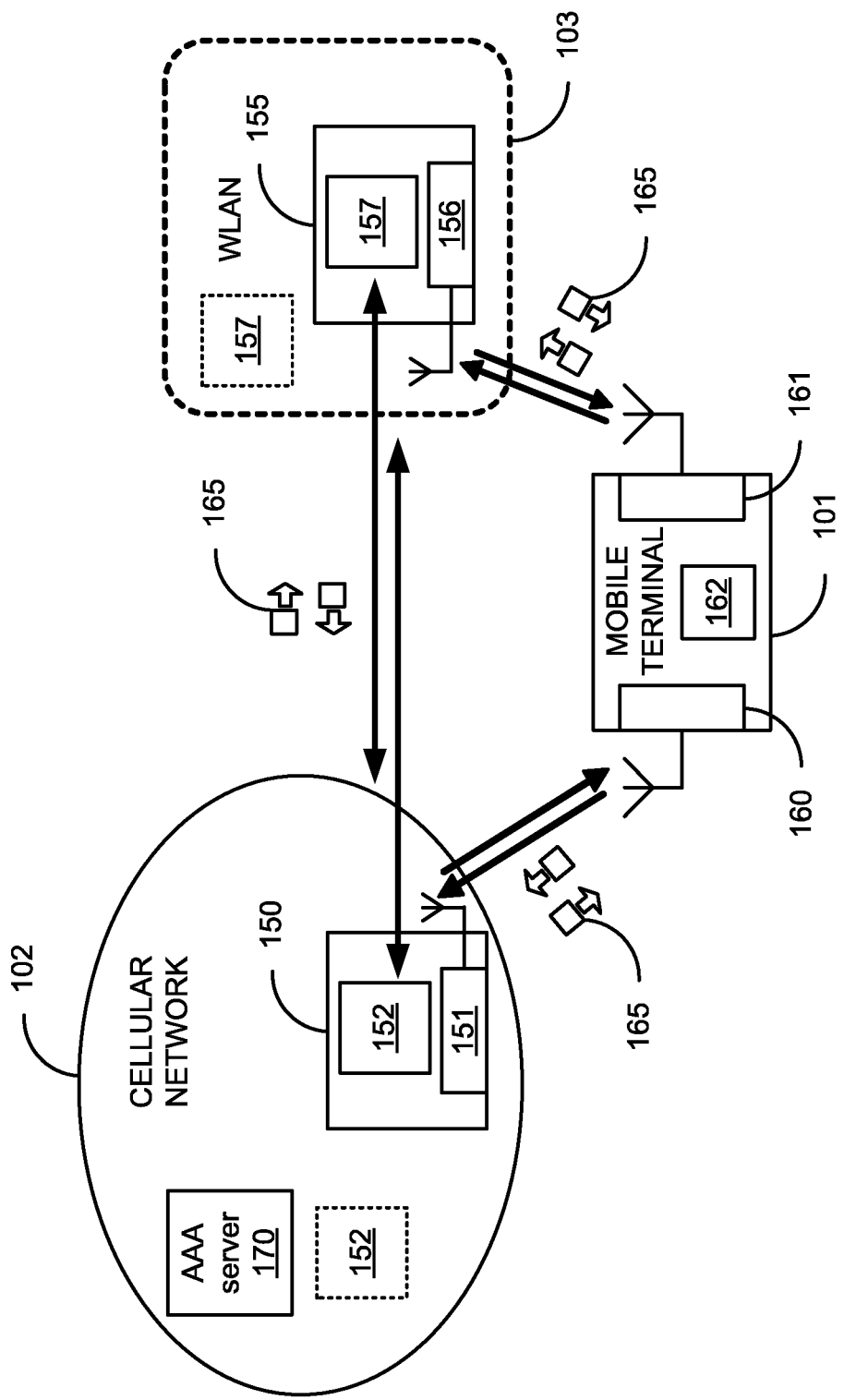
FIG. 1 is a network diagram in which example embodiments of the present invention may be employed.

FIG. 1 shows a cellular network and a wireless local area network (WLAN) internetworked and in communication with one another. In this figure, the infrastructure side of the cellular network is simply referred to, and will be referred to from here on, as a "cellular network" 102, which includes base stations, base station controllers, and other corresponding building blocks. A mobile terminal 101 is shown in communication with the cellular network 102, and a WLAN. In FIG. 1, an access point (AP) and corresponding controlling modules that form the routing side of the WLAN are referred to, and from here on, as "WLAN" 103. The mobile terminal 101 corresponds to a subscriber or customer of the cellular network 102. The mobile terminal 101 wants to access the WLAN 103. With the embodiments about to be described, the mobile terminal 101 need not be a subscriber of the WLAN 103 or subscribe to services provided by the WLAN 103 to access the WLAN 103. Instead, the embodiments provide the mobile terminal 101 with access to the WLAN 103 as a subscriber of the cellular network 102.

To provide the mobile terminal 101 with access to the WLAN 103, an example embodiment identifies the mobile terminal 101 and the WLAN 103 from a request made by the mobile terminal 101. Based on the identification, the embodiment authorizes the WLAN 103 to provide the mobile terminal 101 with access.

The embodiment then provides the mobile terminal 101 with access to the WLAN 103 as a subscriber of the cellular network 102. This is contrasted with providing the mobile terminal 101 with access as a subscriber of the WLAN 103.

A convenient embodiment identifies the mobile terminal 101 and WLAN 103 from a request sent from the mobile terminal 101 through the WLAN 103 to the cellular network 102. In this embodiment, the cellular network 102 and the WLAN 103 are in communications already or communications between the networks needs to be established.

Alternatively, another embodiment identifies the mobile terminal 101 and the WLAN 103 from a request sent from the mobile terminal 101 to the cellular network 102. The WLAN 103 may be identified based on a WLAN identification submitted in the request.

A convenient embodiment provides the mobile terminal 101 with access by sending a password to the mobile terminal 101 through the cellular network 102. The sent password is used by the mobile terminal 101 to access the WLAN 103 (e.g., through an access point).

Alternatively, another embodiment provides the mobile terminal 101 with access by allowing the mobile terminal 101 to access the WLAN 103 using a mobile terminal identifier as a key.

A convenient embodiment, in response to the request from the mobile terminal 101, may request the mobile terminal 101 to confirm the request. In this embodiment, authorization occurs upon or is otherwise conditioned on the mobile terminal 101 confirming the request.

Another embodiment authorizes the WLAN 103 to record an expense for providing the mobile terminal 101 with access.

This embodiment then bills an amount to the mobile terminal 101 based on the recorded expense.

The foregoing embodiments may be carried out by network apparatuses, nodes or elements in the cellular network 102 and the WLAN 103, such as a cellular network apparatus 150 and WLAN apparatus 155.

FIG. 1 shows the example cellular network apparatus 150 having a transceiver 151 configured to transmit and receive cellular communications with the mobile terminal over cellular radio, for example. The example apparatus 150 also has a processor 152 communicatively coupled to the WLAN 103. The processor 152 is programmed to perform some of the tasks described above, such as identifying the mobile terminal 101 and WLAN 103 from the received request. The processor 152 may be located elsewhere in the cellular network 102 (denoted by the dotted box labeled "152").

FIG. 1 further shows the example WLAN apparatus 155 having a transceiver 156 configured to transmit and receive wireless communications with the mobile terminal 101. The example apparatus 155 also has a processor 157 communicatively coupled to the cellular network 102. The processor 157 is programmed to perform some of the tasks described above, such as providing the mobile terminal 101 with access to the WLAN 103. The processor 157 may be located elsewhere in the WLAN 103 (denoted by the dotted box labeled "157").

FIG. 1 also shows the example mobile terminal 101 having a cellular network transceiver 160 configured to transmit and receive cellular communications and a WLAN transceiver 161 configured to transmit and receive wireless communications. The mobile terminal 101 also has a processor 162 communicatively coupled to the cellular network 102 and the WLAN 103. The processor 162 is programmed to perform some of the tasks described above, such as requesting access to the WLAN 103 by sending the request to the cellular network 102, for example, and accessing the WLAN 103.

Additionally, the foregoing embodiments may involve exchanging messages 165.

Figure 2A:
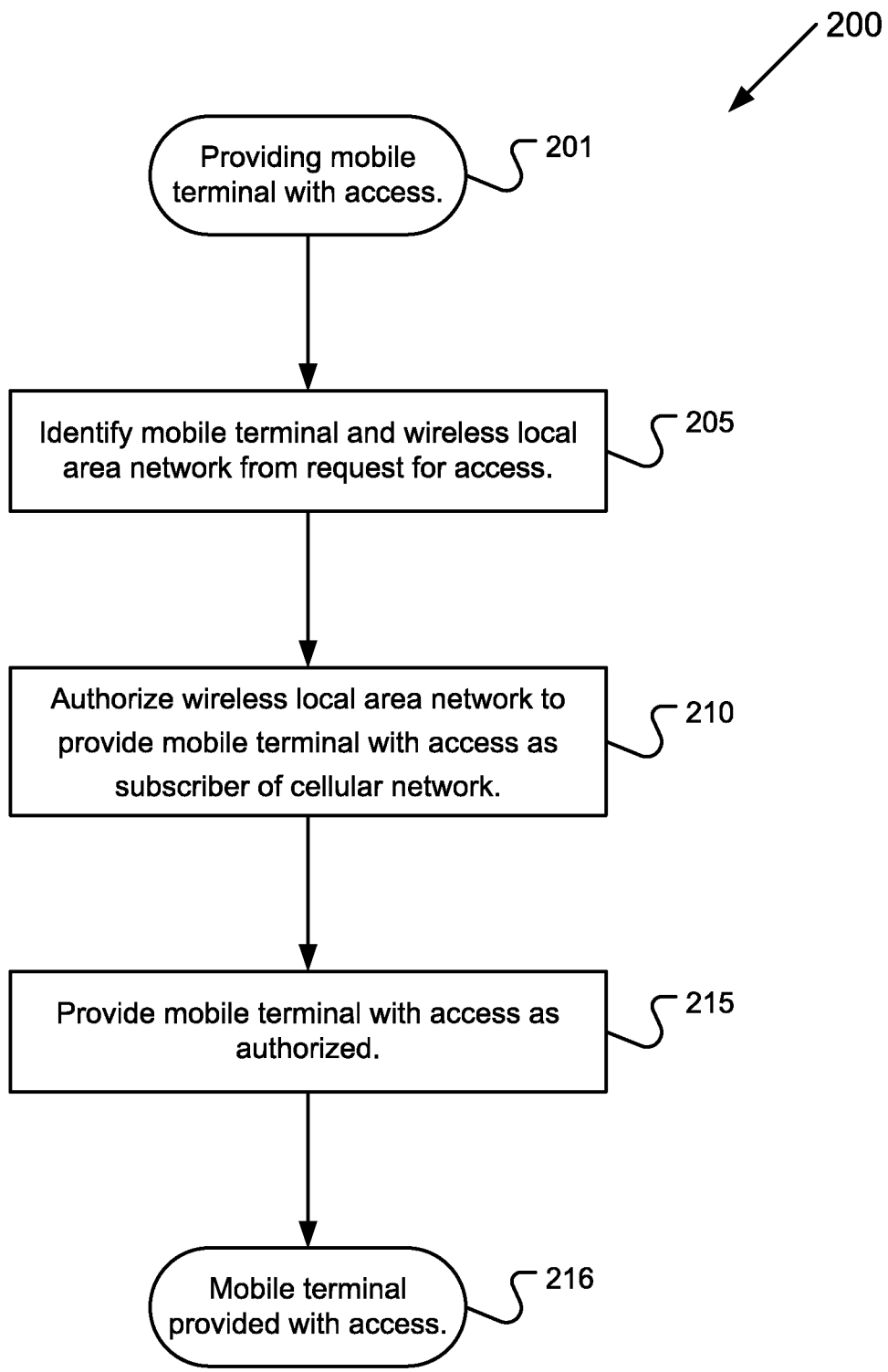
FIGS. 2A and 2B are flowcharts of example procedures for providing a mobile terminal with access to a wireless local area.

FIG. 2A shows an example procedure 200 performed by a system for providing a mobile terminal (e.g., the mobile terminal 101 of FIG. 1) with access to a WLAN (e.g., the WLAN 103 of FIG. 1). The mobile terminal wants to access the WLAN and sends a request for access. The request may be sent from the mobile terminal through the WLAN to a cellular network (e.g., the cellular network 102 of FIG. 1). Alternatively, the request may be sent from the mobile terminal directly to the cellular network.

Either instance starts (201) the procedure 200. The system identifies (205) the mobile terminal and the WLAN from the request. In an example system, the cellular network or a node for the network, such as an authentication, authorization, and accounting server (e.g., AAA server 170 of FIG. 1), identifies (205) the mobile terminal and the WLAN from the request.

One embodiment identifies the mobile terminal from a request sent from the mobile terminal through the WLAN to the cellular network. Another embodiment identifies the WLAN from a request sent from the mobile terminal to the cellular network.

Based on the identities of the mobile terminal and WLAN identified at 205, the system authorizes (210) the WLAN to provide the mobile terminal with access. In an example system, the cellular network or a node for the network, such as the AAA server, authorizes (210) the access.

The system then provides (215) the mobile terminal with access to the WLAN. In an example system, the WLAN or a node for the network, such as an access point or a controller with AAA functionality provides (215) the access. An example embodiment provides the mobile terminal with access by sending a password to the mobile terminal through the cellular network. Another embodiment provides access by allowing the mobile terminal to access the WLAN using its mobile terminal identifier as a key.

Optionally, in response to the request from the mobile terminal, the system requests the mobile terminal to confirm the request. In this case, the system authorizes the WLAN to provide the mobile terminal with access in response to the mobile terminal confirming the request.

Optionally, the system authorizes the WLAN to record an expense for providing the mobile terminal with access. The system then bills an amount to the mobile terminal based on the recorded expense. In an example system, the cellular network sends a subscriber using the mobile terminal a bill. The bill may be sent to the subscriber and/or mobile terminal as a text message, email, mail, webpage, hyperlink to a webpage or other form of suitable communication.

The system ends (216) the procedure 200 having provided the mobile terminal with access to the WLAN.

Figure 2B:
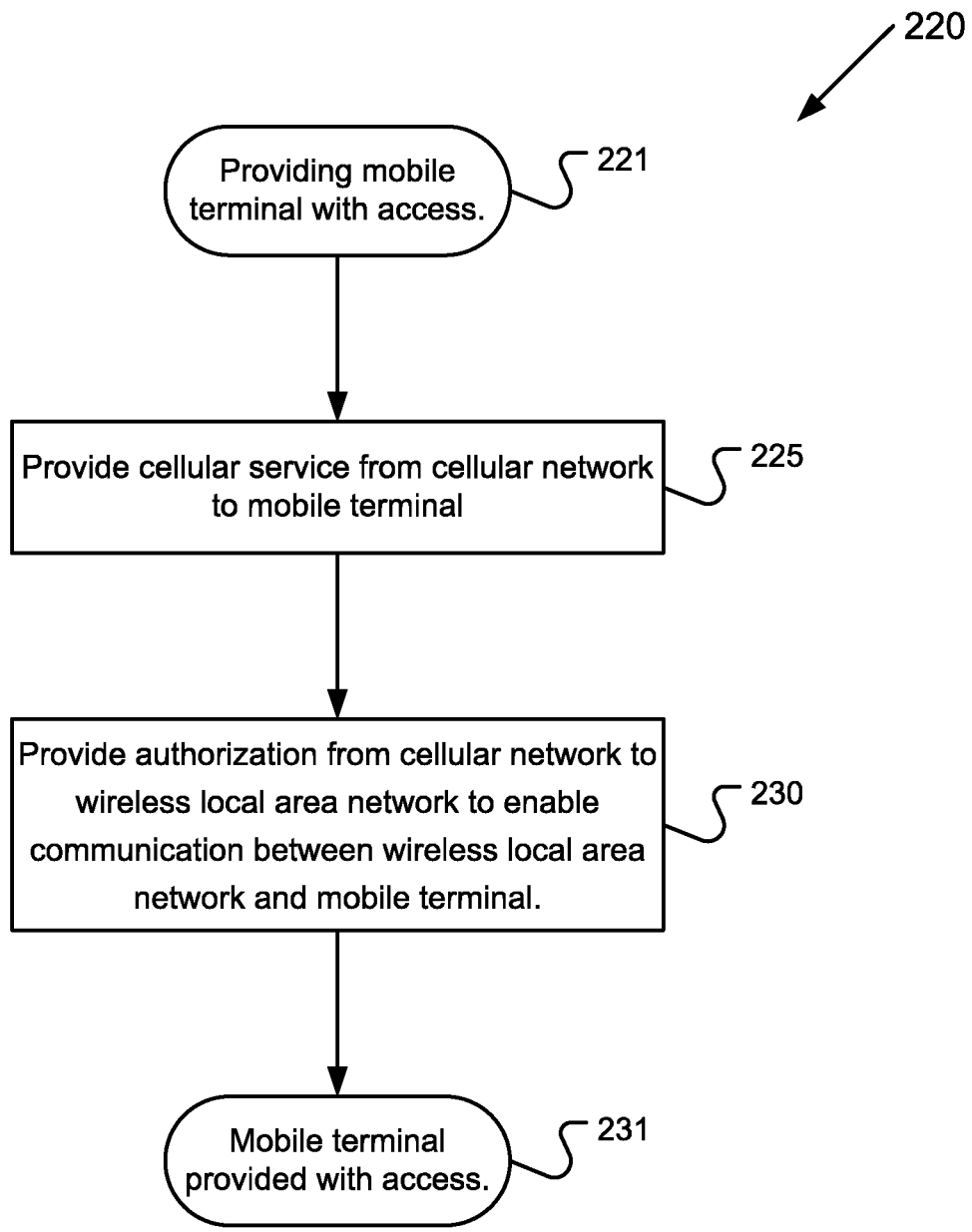

FIG. 2B shows an example procedure 220 performed by a cellular network (e.g., the cellular network 102 of FIG. 1) or by a node in the cellular network (e.g., the cellular network apparatus 150) for providing a mobile terminal (e.g., the mobile terminal 101 of FIG. 1) with access to a WLAN (e.g., the WLAN 103 of FIG. 1).

The cellular network starts (221) the procedure 220. The cellular network provides (225) cellular service from the cellular network to the mobile terminal. It also provides (230) authorization from the cellular network to the WLAN. This enables communication between the WLAN and the mobile terminal.

In one example, the mobile terminal wants to access the WLAN and sends a request for access. The cellular network receives the request sent from the mobile terminal through the WLAN. Alternatively, the cellular network receives the request sent directly from the mobile terminal.

In a convenient embodiment, to provide authorization, the cellular network identifies the mobile terminal and the WLAN from the request. The request being received from the mobile terminal either directly or through the WLAN.

Based on the identities of the mobile terminal and WLAN identified, the cellular network authorizes the WLAN to provide the mobile terminal with access.

In another embodiment, to provide authorization, the cellular network forwards a password from the WLAN through the cellular network to the mobile terminal to provide authorization. The password being forwarded is used by the mobile terminal to access the WLAN.

Optionally, the cellular network sets up communications between the cellular network and the WLAN. The cellular network uses the communications to send the authorization to the WLAN. The authorization allows the WLAN to provide the mobile terminal with access to the WLAN. In turn, this enables communication between the WLAN and the mobile terminal.

The cellular network ends (231) the procedure 220 having provided the mobile terminal with access to the WLAN.

The foregoing procedures 200 and 220 may be carried out using messages; in particular, messages for signaling the mobile terminal, the cellular network, and the WLAN.

Figure 3A:
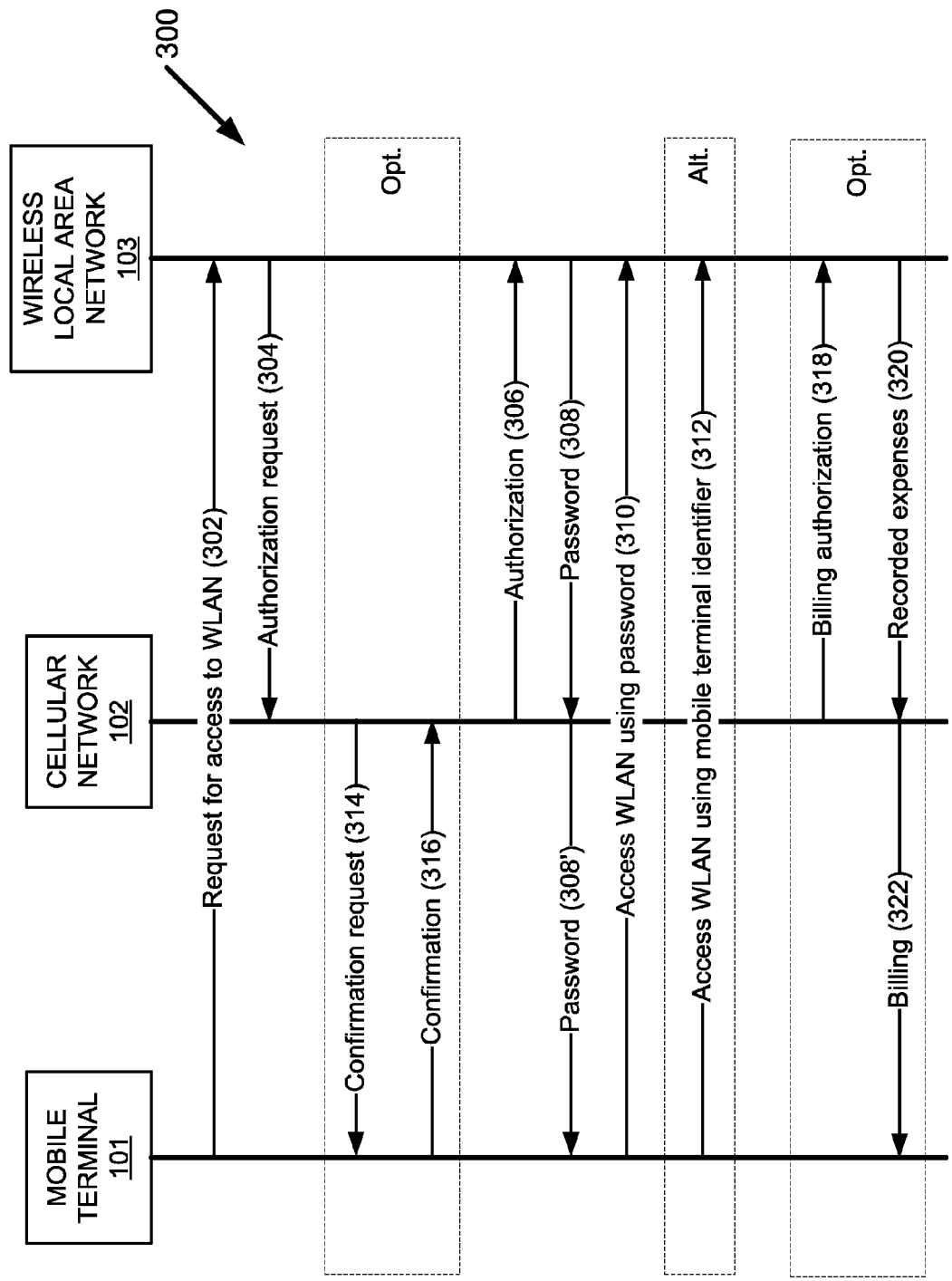
FIGS. 3A-B are message diagrams of example messages exchanges.

FIG. 3A shows an example message exchange 300 between the mobile terminal 101, the cellular network 102, and the WLAN 103 of FIG. 1.

The mobile terminal 101 sends a request message 302 to the WLAN 103 to request access to the WLAN 103.

The WLAN 103 sends an authorization request message 304 to the cellular network 102 to request it be authorized to provide the mobile terminal 101 with access. In the example illustrated, the WLAN 103 establishes communications with the cellular network 102.

Alternatively, instead of sending the authorization request message 304, the WLAN 103 may forward the request message 302 to the cellular network 102. The WLAN 103 forwards the request message 302 to request that it be authorized to provide the mobile terminal 101 with access.

Returning to FIG. 3A, the cellular network 102 sends an authorization message 306 to the WLAN 103 to authorize the WLAN 103 to provide the mobile terminal 101 with access.

In one example, to provide the mobile terminal 101 with access to the WLAN 103, the WLAN 103 sends a password message 308 to the cellular network 102. The password message 308 includes a password used by the mobile terminal 101 to access the WLAN 103. The cellular network 102, in turn, forwards the password message, denoted by 308', to the mobile terminal 101.

The mobile terminal 101 accesses (310) the WLAN 103 using the password.

As an alternative to 310 (denoted by the dotted-line box labeled "Alt."), to provide the mobile terminal 101 with access to the WLAN 103, the WLAN 103 allows the mobile terminal 101 access using a mobile terminal identifier. The mobile terminal 101 accesses (312) the WLAN 103 using its mobile terminal identifier as a key.

In addition to the foregoing messages, optionally (denoted by the dotted-line box labeled "Opt."), to confirm the request for access by the mobile terminal 101, the cellular network 102 sends it a confirmation request message 314. The mobile terminal 101 responds with a confirmation message 316 to confirm its request.

In addition to the foregoing messages (and independent of the previous optional messages 314 and 316), optionally (denoted by the dotted-line box labeled "Opt."), the cellular network 102 sends a billing authorization message 318 to the WLAN 103. This authorizes the WLAN 103 to record an expense for providing the mobile terminal 101 with access. In turn, the WLAN 103 returns a recorded expense message 320 to the cellular network 102. The cellular network 102 then may send a billing message 322 to the mobile terminal 101 to bill an amount to the mobile terminal 101.

As described previously, in addition to a mobile terminal sending a request through a WLAN to a cellular network, as shown in FIG. 3A, the mobile terminal may also send the request to the cellular network directly as described below.

Figure 3B:
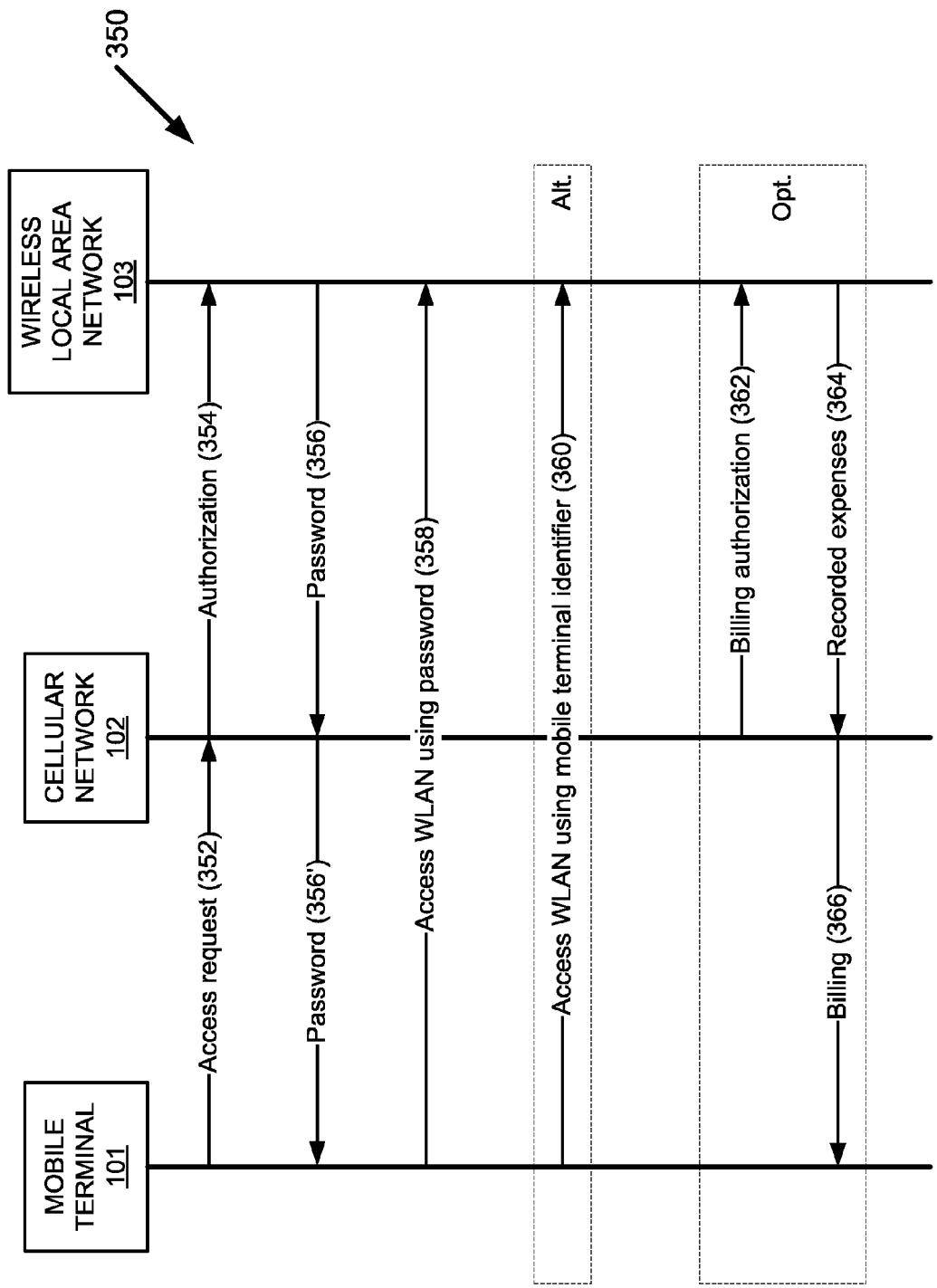

FIG. 3B shows the example message exchange 350 between the mobile terminal 101, the cellular network 102, and the WLAN 103 of FIG. 1.

The mobile terminal 101 sends a request message 352 to the cellular network 102 to request access to the WLAN 103.

The cellular network 102 sends an authorization message 354 to the WLAN 103. This authorizes the WLAN 103 to provide the mobile terminal 101 with access. In the example illustrated, the cellular network 102 establishes communications with the WLAN 103.

In one example, to provide the mobile terminal 101 with access to the WLAN 103, the WLAN 103 sends a password message 356 to the cellular network 102. The password message 356 includes a password used by the mobile terminal 101 to access the WLAN 103. The cellular network 102 forwards the password message, denoted by 356', to the mobile terminal 101.

The mobile terminal 101 then accesses (358) the WLAN 103 using the password.

As an alternative to 358 (denoted by the dotted-line box labeled "Alt."), to provide the mobile terminal 101 with access to the WLAN 103, the WLAN 103 allows the mobile terminal 101 access using a mobile terminal identifier. The mobile terminal 101 then accesses (360) the WLAN 103 using its mobile terminal identifier as a key.

In addition to the foregoing messages, optionally (denoted by the dotted-line box labeled "Opt."), the cellular network 102 sends a billing authorization message 362 to the WLAN 103. This authorizes the WLAN 103 to record an expense for providing the mobile terminal 101 with access. In turn, the WLAN 103 returns a recorded expense message 364 to the cellular network 102. The cellular network 102 then sends a billing message 366 to the mobile terminal 101 to bill an amount to the mobile terminal 101.

The example message exchange 350 may also include an identification message from which to identify the WLAN 103. The identity of the mobile terminal 101 may be gleaned or otherwise discovered from the request message 352 sent to the cellular network 102.

The foregoing messages may be formatted and exchanged according to a protocol. In the context of the described embodiments, a protocol is a set of rules for networks and network elements, such as the mobile terminal 101, the cellular network 102, the WLAN 103, the cellular network apparatus 150, and the WLAN apparatus 155 of FIG. 1 to communicate and interact with one another. A protocol may be set forth in a standard by an organization, such as the International Telecommunication Union (ITU), Institute of Electrical and Electronics Engineers (IEEE), the 3rd Generation Partnership Project (3GPP), or the Internet Engineering Task Force (IETF).

In some instances, it may be convenient for the protocol to be a stateful protocol in which details of interactions are remembered and stored. In other instances it may be convenient for the protocol to be a stateless protocol in which details of interactions are not remembered or stored.

In some instances, it may be convenient for the protocol to be a connection-oriented protocol in which a connection (or session) between a source and destination is established first. Then using the connection, data is delivered in the same order as it was sent. In other instances it may be convenient for the protocol to be a connectionless protocol in which data is not sent via a connection, but transmitted into a network based on destination alone.

The instant protocol may be organized with other protocols in a protocol stack. Each protocol within the stack is independent of one another. Protocols positioned lower in the stack (i.e., lower layer protocols) support protocols positioned above them.

For example and in reference to FIG. 1, the instant protocol may be supported by other protocols used to internetwork the mobile terminal 101, cellular network 102, and wireless network at the physical layer, data link layer, network layer, and other layers. It should be readily apparent that the principles described herein are not limited by or to these supporting protocols.

Figure 4A:
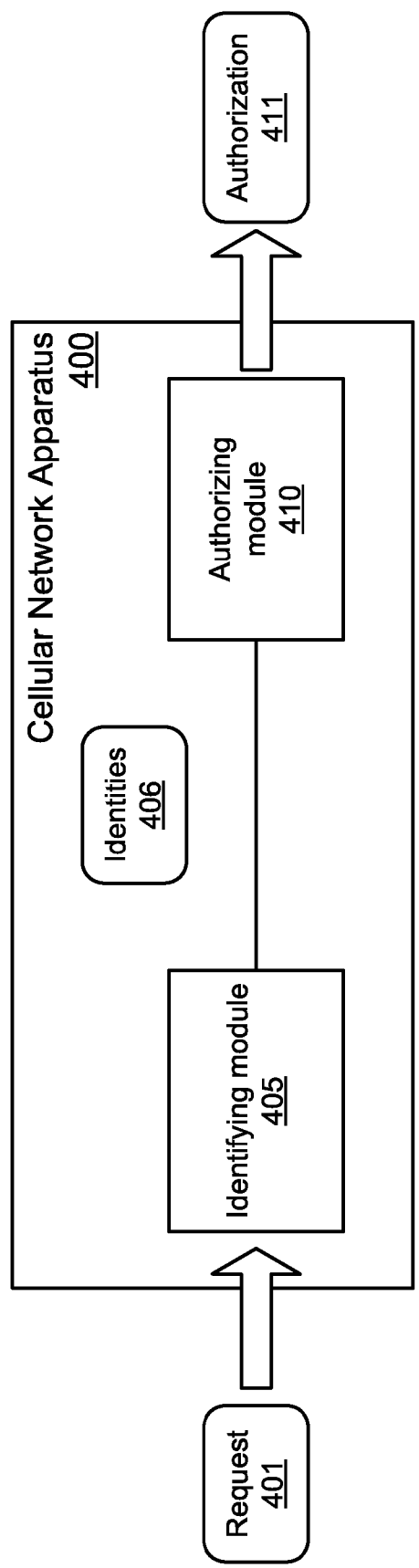
FIGS. 4A-C are block diagrams of example devices to provide a mobile terminal with access to a wireless local area.

FIG. 4A shows an example cellular network apparatus 400 (e.g., the cellular network apparatus 150 of FIG. 1) in a cellular network. The apparatus 400 is configured to provide a mobile terminal with access to a WLAN. The apparatus 400 has an identifying module 405 and an authorizing module 410 communicatively coupled to each other.

From a request 401, the identifying module 405 identifies the mobile terminal and the WLAN, represented in FIG. 4A as mobile terminal and WLAN identities 406.

Based on the identities 406, the authorizing module 410 authorizes the WLAN to provide the mobile terminal with access to the WLAN as a subscriber of the cellular network, represented in FIG. 4A as authorization 411.

Figure 4B:
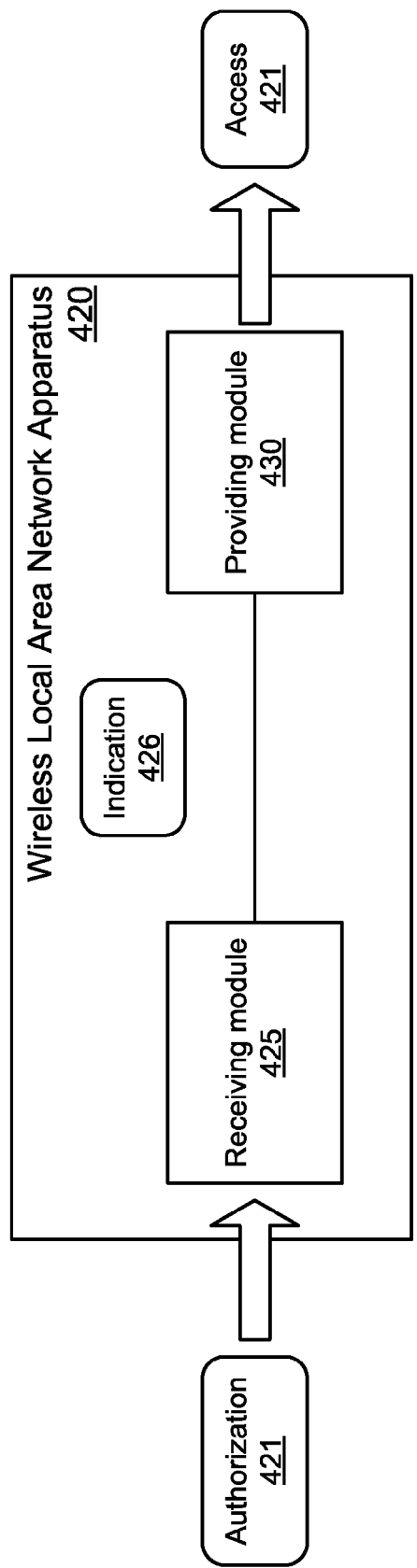

FIG. 4B shows an example WLAN apparatus 420 (e.g., the WLAN apparatus 155 of FIG. 1) in a WLAN. The apparatus 420 is configured to provide a mobile terminal with access to the WLAN. The apparatus 420 has a receiving module 425 and a providing module 430 communicatively coupled to each other.

The receiving module 425 receives an authorization 421 from a cellular network to provide the mobile terminal with access to the WLAN as a subscriber of the cellular network.

An indication 426 represents the receiving module 425 having received the authorization 421. Upon the indication 426, the providing module 430 provides the mobile terminal with access to the WLAN as authorized, represented in FIG. 4B as access 431. In some cases, the access 431 is in the form of a password message having a password for the mobile terminal to use. In other cases, the access 431 is in the form of allowing the mobile terminal to access the WLAN using its mobile terminal identifier as a key.

Figure 4C:
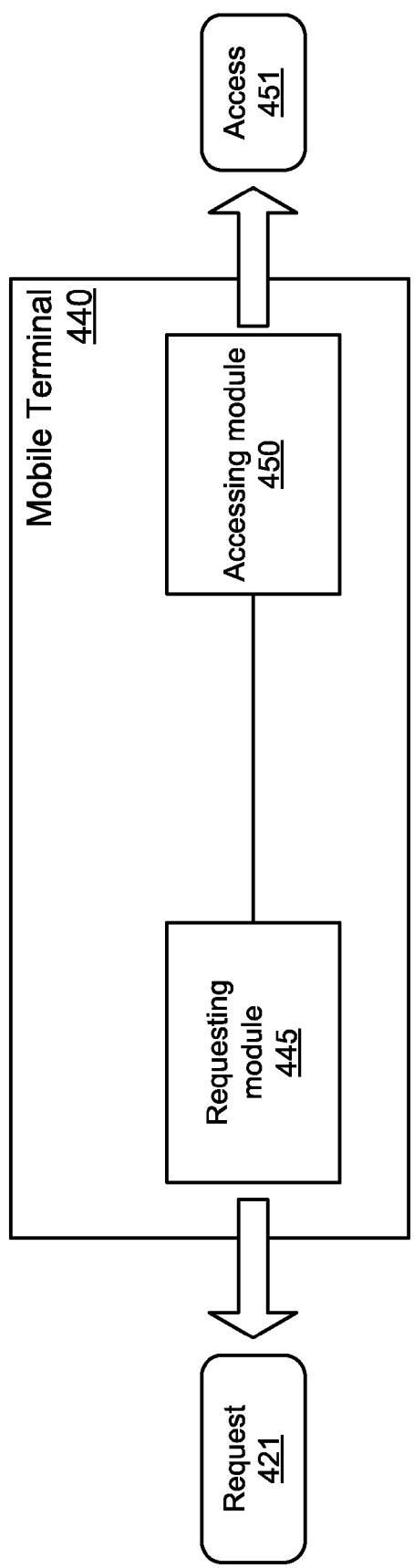

FIG. 4C shows an example mobile terminal 440 (e.g., the mobile terminal 101 of FIG. 1). The mobile terminal 440 has a requesting module 445 and an accessing module 450 communicatively coupled to each other.

The requesting module 445 requests access to the WLAN, represented in FIG. 4C as request 446. The accessing module 450 accesses the WLAN as a subscriber of the cellular network, represented in FIG. 4C as access 451. In some cases, the access 451 is in the form of an access message having a password. In other cases, the access 431 is in the form of an access message having a mobile terminal identifier as a key.

Alternatively, the example cellular network apparatus 400, the example WLAN apparatus 420, and the example mobile terminal 440 may each be a general purpose computer having a processor, memory, communication interface(s), etc. (described in greater detail in reference to FIG. 5). The general purpose computer is transformed into the example cellular network apparatus 400 and its components, for example, by loading instructions into the processor. This causes the computer to identify a mobile terminal and a WLAN from a request by the mobile terminal for access to the WLAN. Based on identifying the mobile terminal and the WLAN, the computer then authorizes the WLAN to provide the mobile terminal with access to the WLAN.

Figure 5:
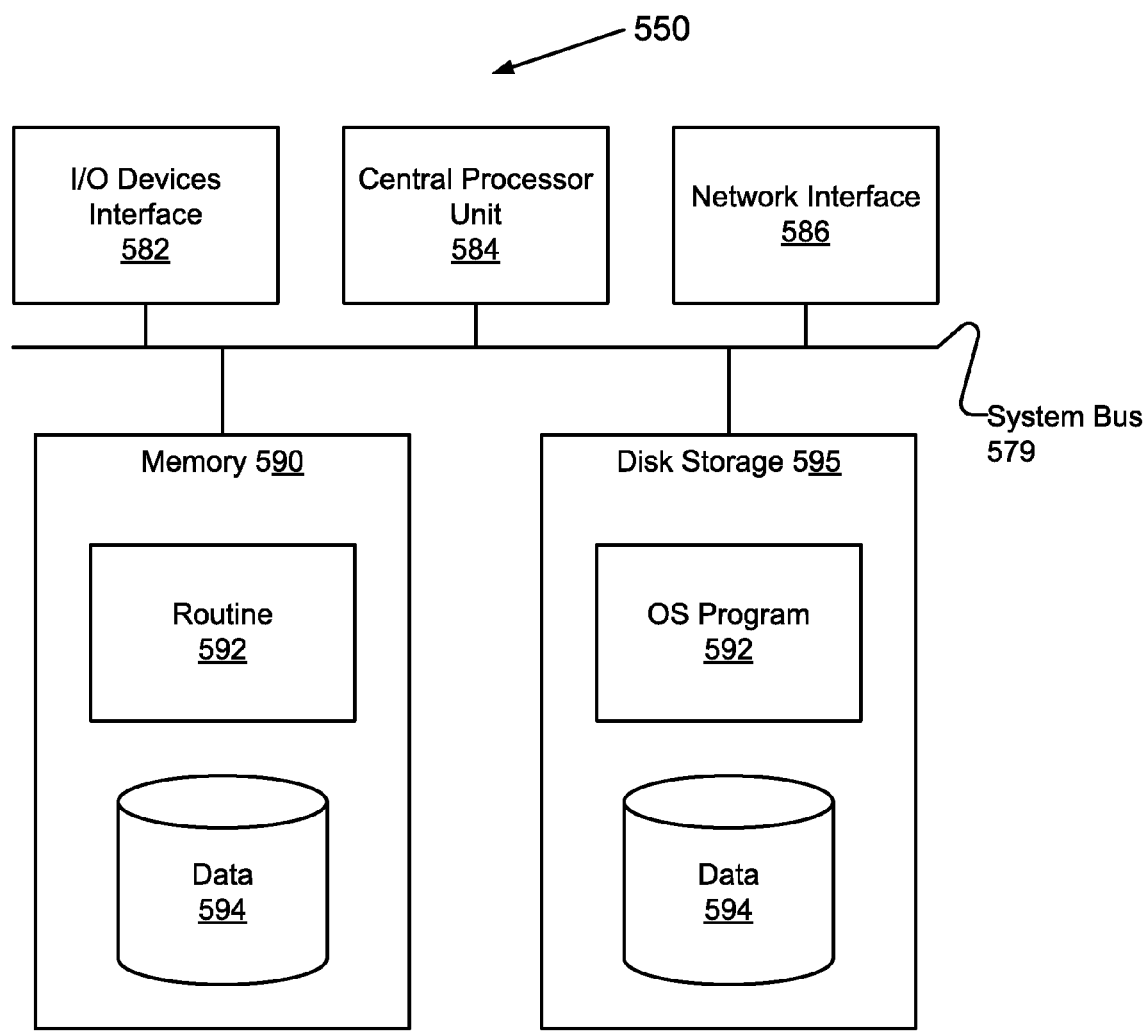
FIG. 5 is a block diagram of an example computer implementing embodiments of the present invention.

FIG. 5 shows the internal structure of a computer 550 in which various embodiments (e.g., the procedure 200 of FIG. 2) may be implemented. The computer 550 may be located, for example, in the cellular network 102 or the WLAN 103 of FIG. 1. The computer 550 contains system bus 579, where a bus is a set of hardware lines used for data transfer among the components of a computer or processing system. Bus 579 is essentially a shared conduit that connects different elements of a computer system (e.g., processor, disk storage, memory, input/output ports, network ports, etc.) that enables the transfer of information between the elements. Attached to system bus 579 is I/O device interface 582 for connecting various input and output devices (e.g., keyboard, mouse, displays, printers, speakers, etc.) to the computer 550. Network interface 586 allows the computer to connect to a network (e.g., the cellular network 102 and WLAN 103 of FIG. 1). Memory 590 provides volatile storage for computer software instructions 592 and data 594 used to implement an embodiment of the present invention (e.g., the procedure 200). Disk storage 595 provides non-volatile storage for computer software instructions 592 and data 594 used to implement an embodiment of the present invention (e.g., the procedure 200). Central processor unit 584 is also attached to system bus 579 and provides for the execution of computer instructions.

In one embodiment, the processor routines 592 and data 594 are a computer program product (generally referenced 592), including a computer readable medium (e.g., a removable storage medium such as one or more DVD-ROM's, CD-ROM's, diskettes, tapes, and other non-transitory medium) that provides at least a portion of the software instructions for the invention system. Computer program product 592 can be installed by any suitable software installation procedure, as is well known in the art.

The foregoing embodiments may be implemented in a variety of computer architectures. The computer of FIG. 5 is for purposes of illustration and does not limit the present invention.

Further, the foregoing embodiments may be implemented in various network configurations described below in reference to the figures.

Figure 6:
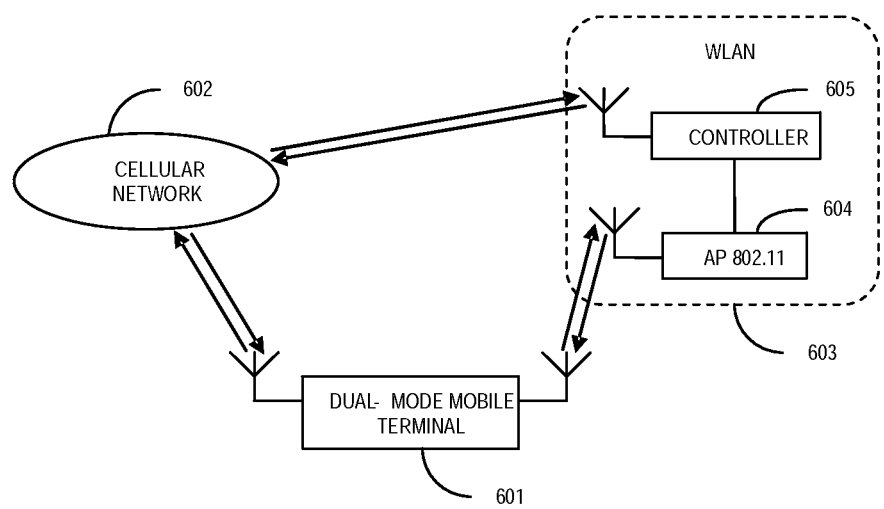
FIGS. 6, 9-11, and 15-17 are network diagrams of example network configurations in which embodiments of the present invention may be employed.

FIG. 6 shows the architecture of a non-limiting embodiment. In this example, a multimode mobile terminal is a dual-mode mobile terminal having dual-mode (cellular and Wi-Fi) radios and the capability to switch between them. It can communicate with both a cellular network and a wireless local area network (WLAN) 603. Principles of the present invention, however, are not limited to a specific number of modes, such as two. Rather, they apply to architectures or situations in which a mobile terminal is capable of switching among different modes (e.g., cellular and wireless modes). The terms multimode mobile terminal and dual-mode mobile terminal are used interchangeably herein.

An access point ("AP") 604 provides the radio link towards the dual-mode mobile terminal 601 using unlicensed spectrum. The access point 604 provides, for example, IEEE 802.11 access point functionality.

The dual-mode mobile terminal 601 accesses the WLAN 603 through the access point 604. However, the mobile terminal 601 must be authorized to access the access point 604.

The controller 605 is responsible for authentication, authorization, and accounting (AAA) for the WLAN 603. Typically, it authenticates a WLAN user, authorizes a connection between the WLAN user and the WLAN, and accounts for use of the connection. In this example embodiment, however, the controller 605 participates in providing the mobile terminal 601 with access to the WLAN 603. This may involve the controller 605 participating in authenticating the mobile terminal 601, authorizing a connection between the mobile terminal 601 and the WLAN 603 (e.g., through the access point 604), and accounting for the connection.

In the example embodiment, the controller 605 uses cellular radio to communicate with an authentication, authorization, and accounting (AAA) server of the cellular network 602. The AAA server of the cellular network 602 and the controller 605 can then, for example, exchange account information about the mobile terminal. The account information may be stored in, for example, a home location register (HLR).

Although shown in the foregoing example embodiment, the controller 605 is not required by other example embodiments. Other example embodiments apply to situations in which a WLAN is free and does not have a controller for authentication, authorization, and accounting.

Continuing with FIG. 6, when a customer requests access to the WLAN 603 through the access point 604, the controller 605 requests the customer to input account information. The customer's account is maintained by the service provider of the cellular network 602. The information may contain an access code. The controller 605 exchanges this information with the AAA server of the cellular network 602. The AAA server retrieves user information from the HLR and compares it with the customer information from the controller 605. If they match, the AAA server sends a notice to the customer's mobile terminal to confirm the customer request to access the WLAN 603. After the customer confirms the notice, the AAA server in the cellular network 602 sends an approval to pay for wireless service to the controller 605 and obtains a password to the access point 604. The AAA server sends the password to the mobile terminal 601 through the cellular network 602. The mobile terminal 601 uses the password to access the WLAN 603 through the access point 604. The controller 605 records the expense for the wireless service of and sends the bill to the AAA server of the cellular network 602.

In greater detail, the controller 605 informs the AAA server in the cellular network 602 which subscriber wants wireless service, such as Wi-Fi service. After the controller 605 receives confirmation of payment (or a promise to pay) for the cost of Wi-Fi services, the controller 605 allows the dual-mode mobile terminal 601 to access its WLAN 603 and records the time and cost. After the mobile terminal 601 ends its communication and disconnects from the WLAN 603, the controller 605 sends all cost information to the AAA server in the cellular network 602. The cost will be shown in the customer's bill from the cellular network provider.

Figure 7:
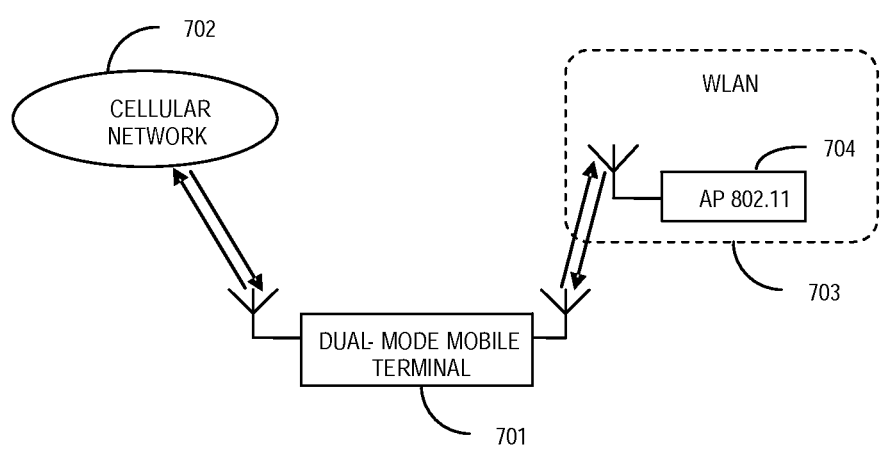
FIGS. 7 and 8 are network diagrams of prior art network configurations.

For comparison, a prior art system shown in FIG. 7 is a free WLAN 703. Unlike the architecture shown in FIG. 6, there is no controller for authentication, authorization, and accounting. As such, the dual-mode mobile terminal 701 can access the access point 704 freely. In this way, a cellular network 702 does not authorize the WLAN 703 to provide the mobile terminal 701 with access as described above in reference to the example embodiments. Moreover, access is not provided to the mobile terminal 701 as a subscriber of the cellular network 702.

Figure 8:
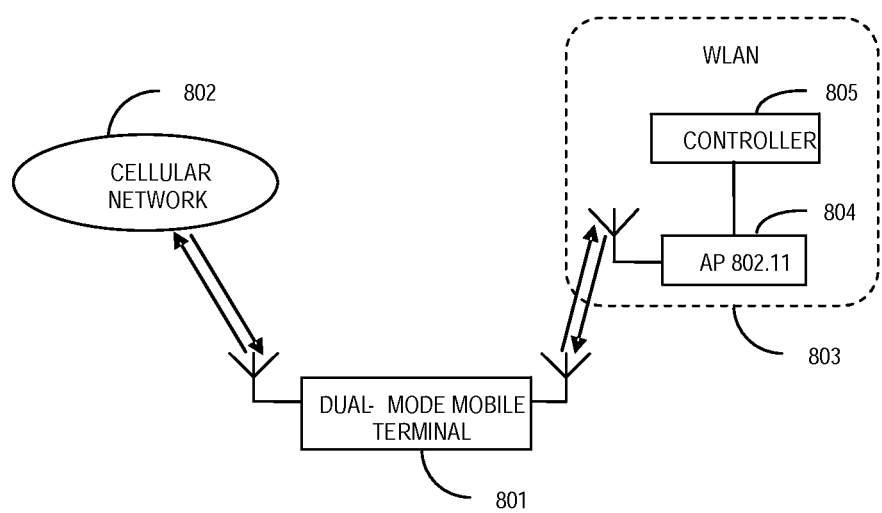

A prior art system shown in FIG. 8 is a toll WLAN 803. The controller 805 is responsible for authentication, authorization, and accounting for the WLAN 803. However, it can not communicate with the cellular network 802. It only works in the WLAN 803 and is independent of the cellular network 802. When the dual-mode mobile terminal 801 wants to access the toll WLAN 803, the controller 805 requests the customer to prepay for the service using credit card. Likewise, as in the other prior art system of FIG. 7, in this system, the cellular network 802 does not authorize the WLAN 803 to provide the mobile terminal 801 with access as described above in reference to the example embodiments. Moreover, access is not provided to the mobile terminal 801 as a subscriber of the cellular network 802.

Figure 9:
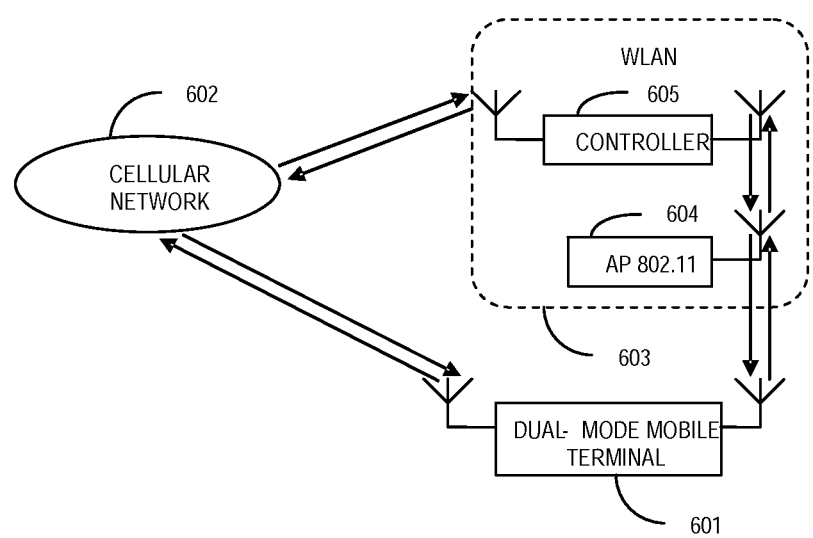
Figure 10:
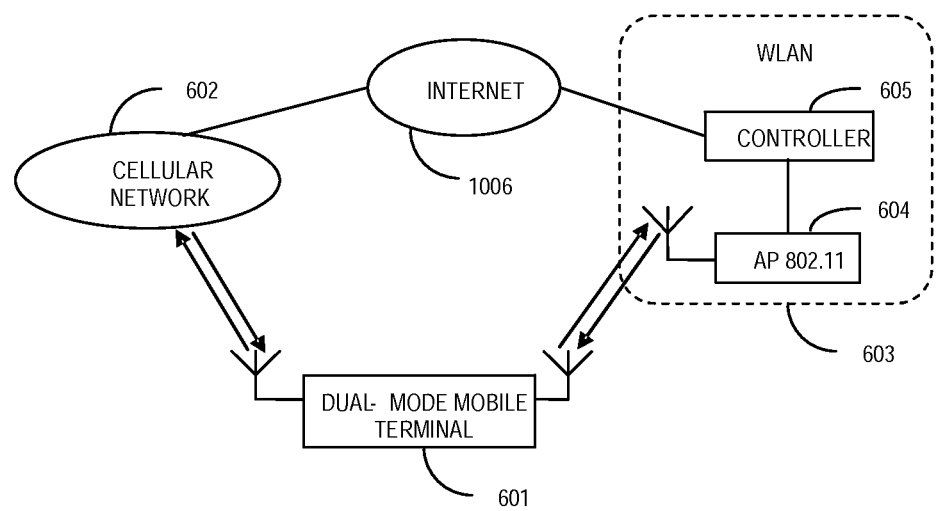
Figure 11:
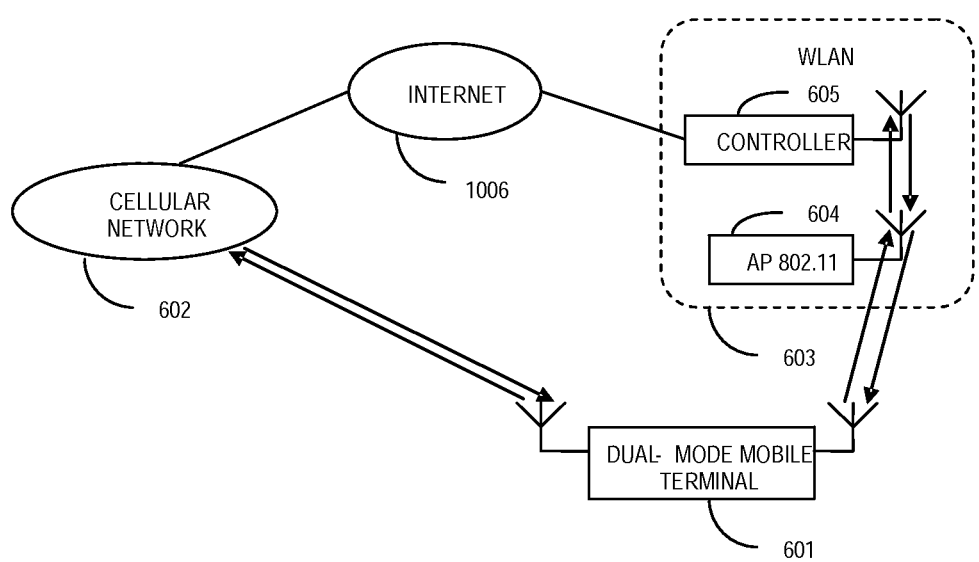
Figure 12A:
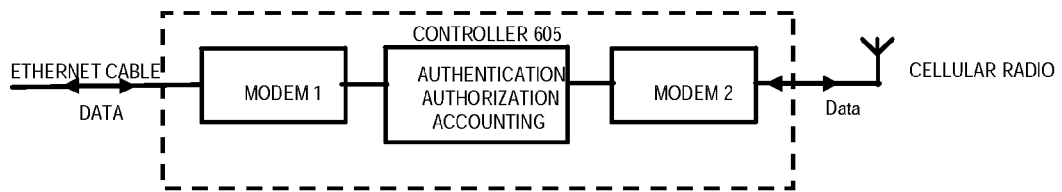
FIGS. 12A-D and 18A-C are block diagrams of example controller configurations.
Figure 12B:
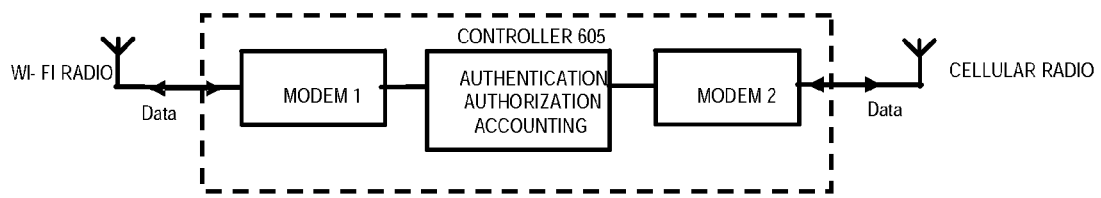
Figure 12C:
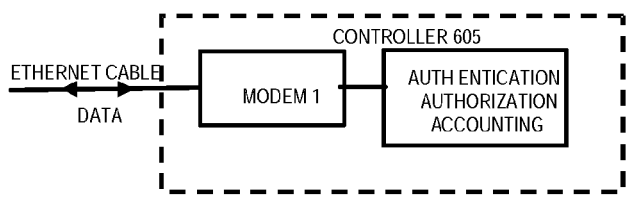
Figure 12D:
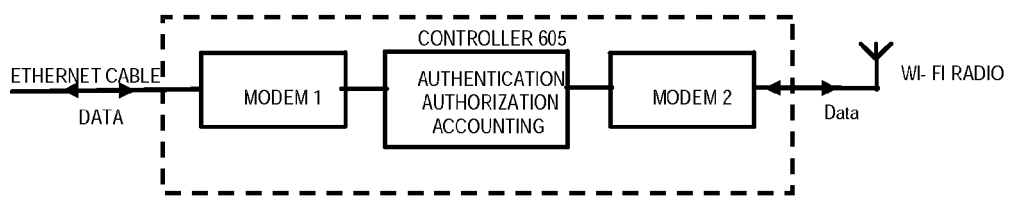

FIGS. 9, 10, and 11 show alternative architectures of the example embodiment shown in FIG. 6. One difference between the architecture of FIG. 6 and the alternative architectures of FIGS. 9-11 is how the access point 604 and the controller 605 communicate with each other. For example, a wired network connection (shown in FIGS. 6 and 10) or a Wi-Fi radio connection (shown in FIGS. 9 and 11) may be used. Other types of connections are also possible.

Another difference between the architectures is how the cellular network 602 communicates with the WLAN 603. In particular, how the cellular network 602 communicates with the controller 605. For example, communications may be over a cellular radio connection (shown in FIGS. 6 and 9), wired network connection, or Internet connection (shown in FIGS. 10 and 11 as 1006). Other types of connections are also possible.

In FIG. 9 for example, the controller 605 has the capability of dual-mode (cellular and Wi-Fi) communications. It uses Wi-Fi communications to control the access point 604, and uses the cellular radio to communicate with the cellular network 602. The Wi-Fi communications between the controller 605 and the access point 604 may use the 2.4 GHz or 5 GHz band. The 5 GHz can be used, for example, as the backhaul.

FIGS. 12A-D show the controller 605 configured differently (e.g., configured with different interfaces) depending on how it communicates with the cellular network 602 and the access point 604.

The configurations shown in FIGS. 12A, 12B, 12C, and 12D correspond to the controller 605 of FIGS. 6, 9, 10, and 11, respectively.

The cellular network 602 (or a cellular network node) and the access point 604, likewise, may be configured differently depending on how they communicate with others.

Figure 13:
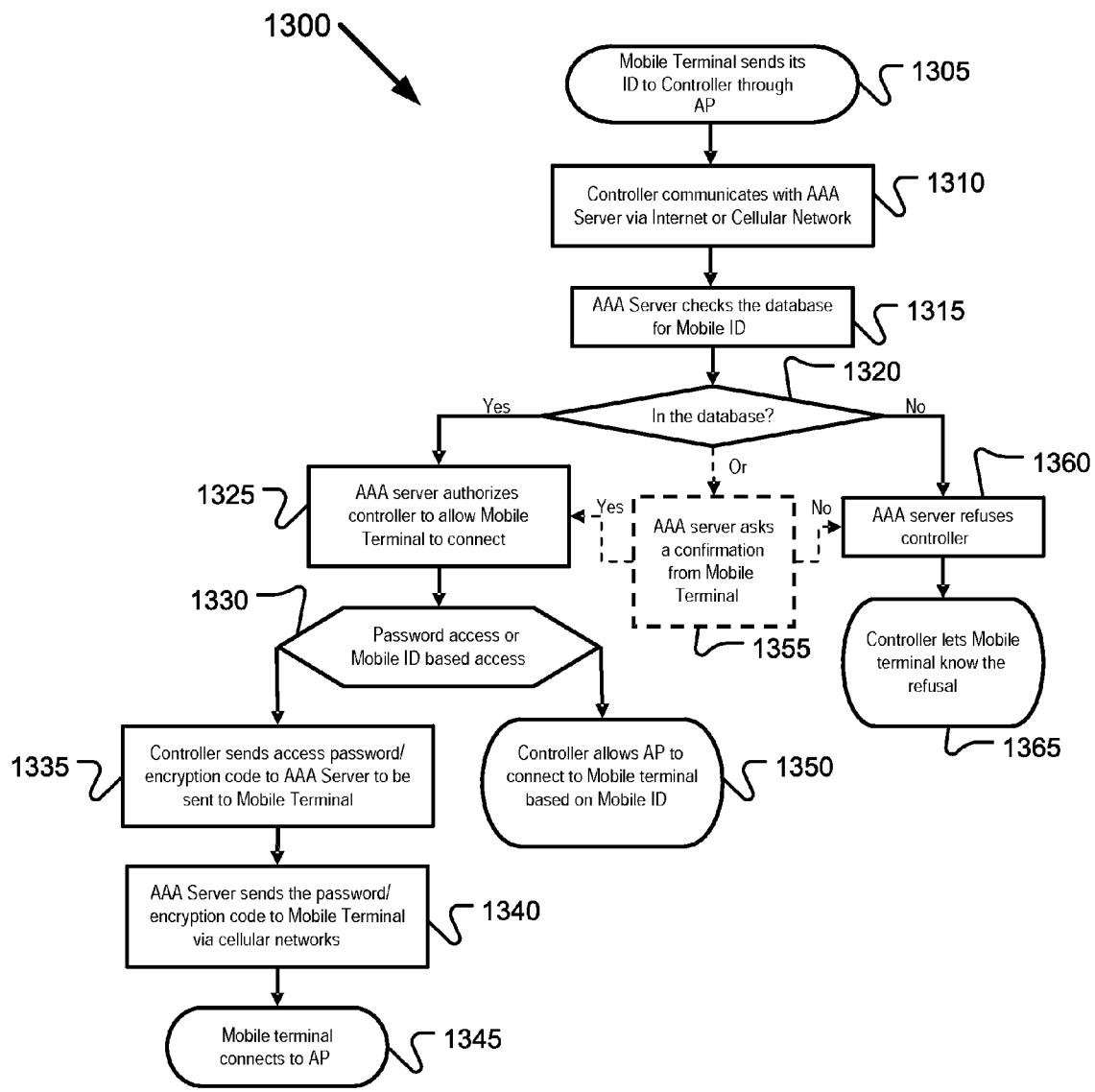
FIGS. 13, 14, 19, and 20 are flowcharts of example procedures for providing a mobile terminal with access to a wireless local area.

FIG. 13 (in conjunction with FIG. 6) shows a flowchart of an example procedure 1300 where the controller 605 contacts AAA server in the cellular network for the access to the WLAN 603. In the procedure 1300:

The dual-mode mobile terminal 601 submits (1305) its identification to the controller 605 after it finds the toll WLAN 603 (e.g., a Wi-Fi access network) and the access point 604.

The controller 605 communicates (1310) with the AAA server in the cellular network 602 to authenticate the mobile terminal 601 according to the ID stored in the mobile terminal 601 or by the cellular network provider.

The AAA server in the cellular network 602 looks (1315) for information corresponding to (or associated with) the incoming mobile terminal 601 in its subscriber accounts stored in the HLR.

Optionally, the AAA server sends (1355) a notice to the dual-mode mobile terminal 601 to confirm its request via the cellular network 602.

If the AAA server determines (1320) that the information of the incoming mobile terminal 601 is in the HLR, then the AAA server authorizes (1325) the controller 605 to connect to the incoming mobile terminal 601.

However, if the AAA server determines (1320) that the information of the incoming mobile terminal 601 is not in the HLR, then the AAA server refuses (1360) the controller 605 authorization to connect to the incoming mobile terminal 601. The controller 605 informs (1365) the mobile terminal 601 that its request for access is denied.

There are two options for the response of the controller 605 after it receives the authorization from the AAA server (represented at 1330). The controller 605 sends (1335) a password to the cellular network 602. Then the cellular network 602 forwards (1340) the password to the mobile terminal 601. The mobile terminal 601 uses (1345) the password to access the WLAN. Alternatively, the controller 605 directly allows (1350) the mobile terminal 601 to access the WLAN using the Media Access Control (MAC) address of the mobile terminal 601 as a key.

Optionally, the AAA server in the cellular network 602 authorizes the controller 605 to record the expense after receiving the optional confirmation from the mobile terminal 601 (at 1355).

The controller 605 sends the expense information to the AAA server in the cellular network 602 after the mobile terminal 601 disconnects from the Wi-Fi network.

The AAA server records the expense to the account of mobile terminal 601. Then the cellular network provider sends a bill, including the cost of Wi-Fi services, to the subscriber of the mobile terminal 601.

Figure 14:
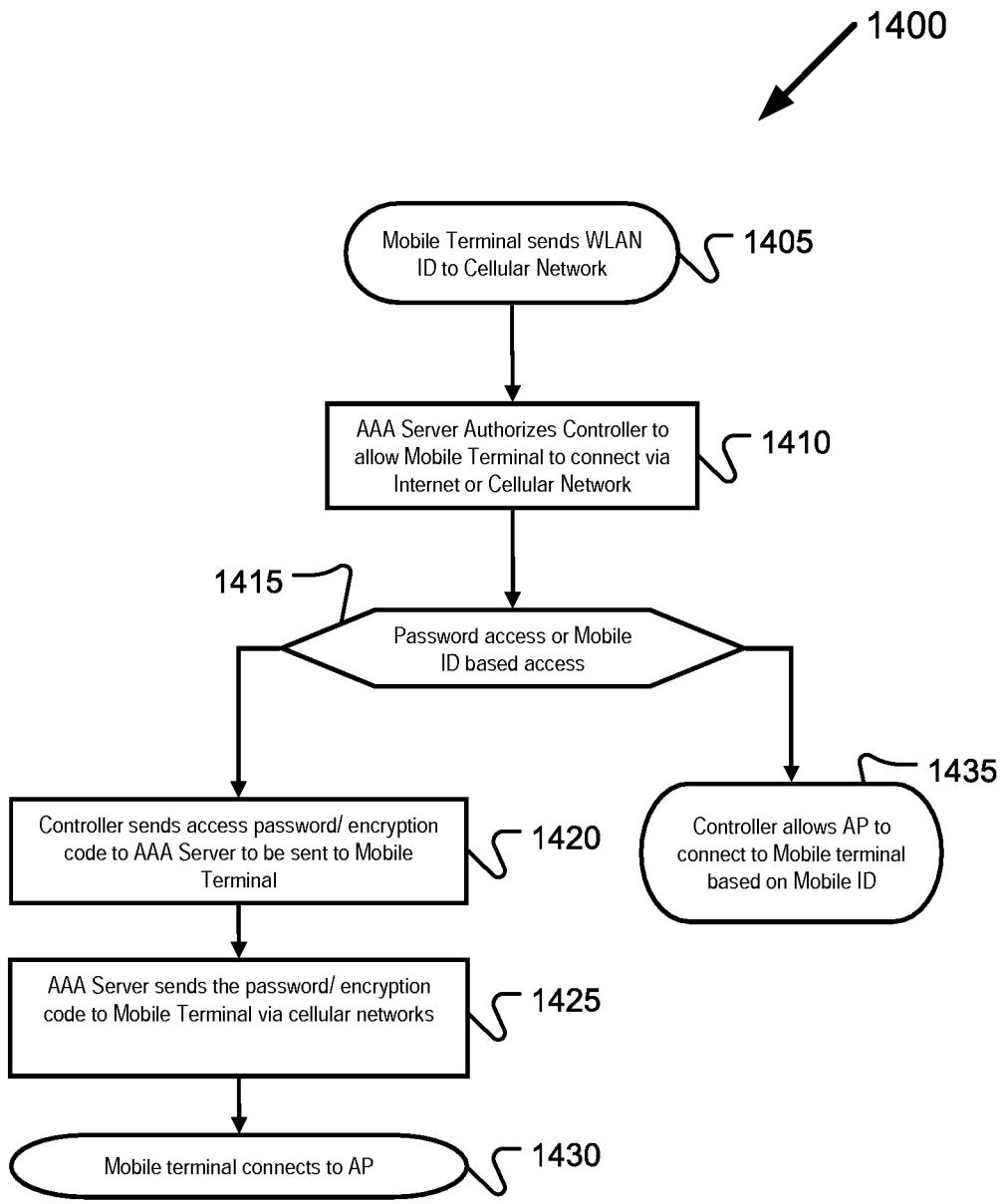

FIG. 14 (in conjunction with FIG. 6) shows a flowchart of an example procedure 1400 where the mobile terminal 601 directly contacts the AAA server in the cellular network 602 for the access to the WLAN 603. In the procedure 1500:

After the dual-mode mobile terminal 601 finds a toll WLAN 603 and the access point 604, it submits (1405) the identification of the WLAN 603 (e.g., a service set identifier (SSID)) to the AAA server in the cellular network 602. Optionally, the AAA server sets up communications with the controller 605 based on the information in its database, which includes information regarding partner cellular network service providers. The communications are set up via the cellular network 602 or the internet, for example.

The AAA server authorizes (1410) the controller 605 to connect to the incoming mobile terminal 601.

There are two options for the response of the controller 605 after it receives the authorization from the AAA server. The controller 605 sends (1420) a password to the cellular network 602 via the cellular network 602 or the internet. The cellular network 602 then forwards (1425) the password to the mobile terminal 601. The mobile terminal 601 uses (1430) the password to access the WLAN 603. Alternatively, the controller 605 directly allows (1435) the mobile terminal 601 to access the WLAN 603 using the MAC address of the mobile terminal 601 as a key.

Optionally, the AAA server authorizes the controller 605 to record the expense.

The controller 605 sends the expense information to the AAA server after the mobile terminal 601 disconnects from the Wi-Fi network.

The AAA server records the expense to an account in the cellular network 602 belonging to mobile terminal 601. Then the cellular network provider sends a bill, including the cost of Wi-Fi services, to the subscriber of the mobile terminal 601.

The foregoing architectures are but examples, and are not intended to limit the example embodiments. It should be readily apparent that the principles disclosed herein also apply to other architectures, such as one based on the Unlicensed Mobile Access (UMA) technology described previously. A UMA-based architecture may include network elements or nodes similar to those described previously, such as the cellular network 602 and the WLAN 603. It also includes different elements described below. Additional example embodiments will now be described in the context of UMA.

Figure 15:
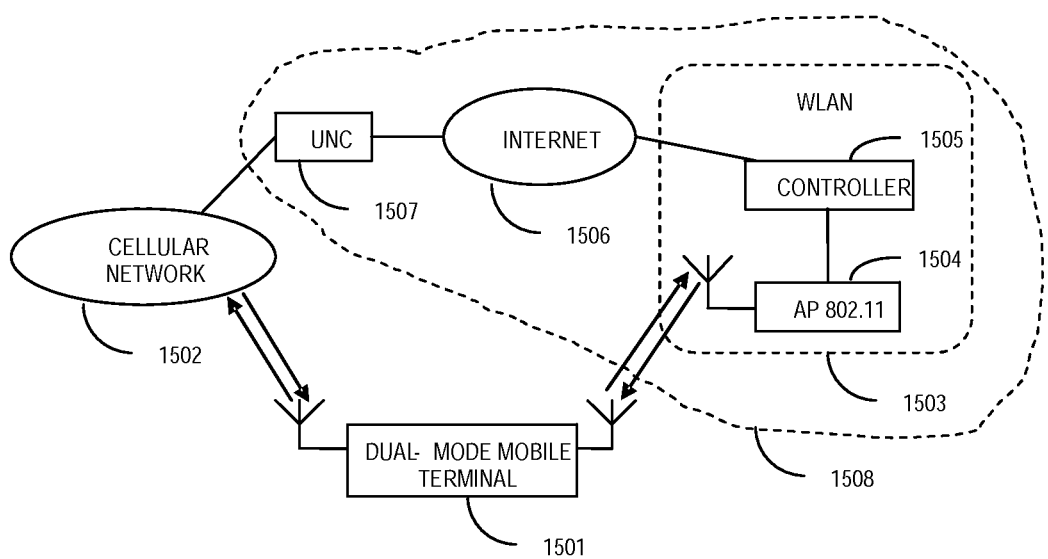

FIG. 15 shows a UMA-based architecture of another non-limiting embodiment. The dual-mode mobile terminal 1501 is a UMA-enabled device with dual-mode (cellular and Wi-Fi) radios and the capability to switch between them. It can communicate with both a cellular network 1502 and a WLAN 1503.

An access point ("AP") 1504 provides the radio link towards the dual-mode mobile terminal 1501 using unlicensed spectrum. It connects through the internet to the UMA network controller (UNC) 1507. The access point 1504 provides, for example, IEEE 802.11 access point functionality.

The dual-mode mobile terminal 1501 accesses the WLAN 1503 through the access point 1504. However, the mobile terminal 1501 must be authorized to access the access point 1504.

The controller 1505 is responsible for authentication, authorization, and accounting for the WLAN 1503. It can use the internet 1506 and UMA network 1508 to communicate with the authentication, authorization, and accounting (AAA) server in core mobile network of the cellular network 1502. The AAA server in core mobile network of the cellular network 1502 and the controller 1505 can then, for example, exchange account information. The information may be stored, for example, in a home location register (HLR).

Although shown in this example embodiment, the controller 1505 is not required in other embodiments. Other example embodiments apply to situations in which an access point or WLAN does not provide authentication, authorization, and accounting functions, and any generic access point can be used to interconnect a mobile terminal to a UNC via the internet.

Continuing with FIG. 15, the UNC 1507 provides similar basic functionality as a conventional base station controller. For example, it handles authentication, encryption and data integrity. It connects via the internet 1506 to the access point 1504.

When a customer requests access to the WLAN 1503 through the access point 1504, the controller 1505 requests the customer to input account information. The customer's account is maintained by the service provider of the cellular network 1502. The information may contain an access code. The controller 1505 exchanges the information with the AAA server in the cellular network 1502 via the internet 1506. The AAA server retrieves user information from the HLR and compares it with the customer information from the controller 1505. If they match, the AAA server sends a notice to the customer's mobile terminal to confirm the customer's request to access the WLAN 1503 through the cellular network 1502. After the customer confirms, the notice, the AAA server sends an approval to pay for wireless service to the controller 1505 and obtains a password through the internet 1506. Then the AAA server sends the password to the mobile terminal 1501 through the cellular network 1502. The mobile terminal 1501 uses the password to access the WLAN 1503 through the access point 1504. The controller 1505 records the expense for the wireless service and sends a bill to the AAA server of cellular network 1502 via the internet 1506.

In greater detail, the controller 1505 informs the AAA server in the cellular network 1502 which subscriber wants wireless service, such as Wi-Fi service. After the controller 1505 receives confirmation of payment (or a promise to pay) for the cost of the Wi-Fi service from the cellular network 1502, the controller 1505 allows the dual-mode mobile terminal 1501 to access the WLAN 1503 and records the time and cost. After the mobile terminal 1501 ends its communication and disconnects from the WLAN 1503, the controller 1505 sends all cost information to the AAA server in the cellular network 1502. The cost will be shown in the customer's bill from the cellular network provider.

Figure 16:
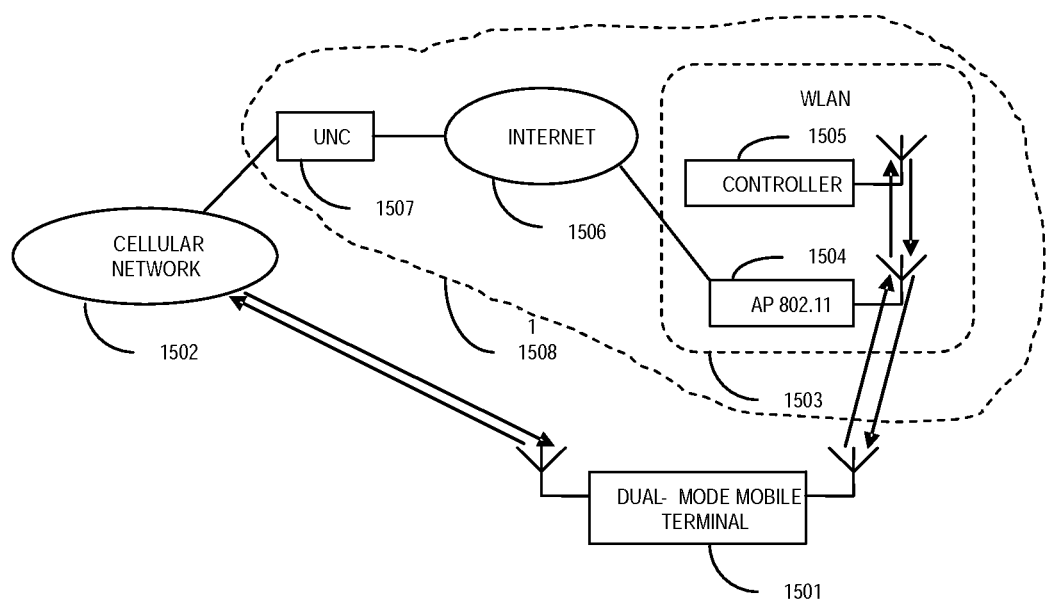
Figure 17:
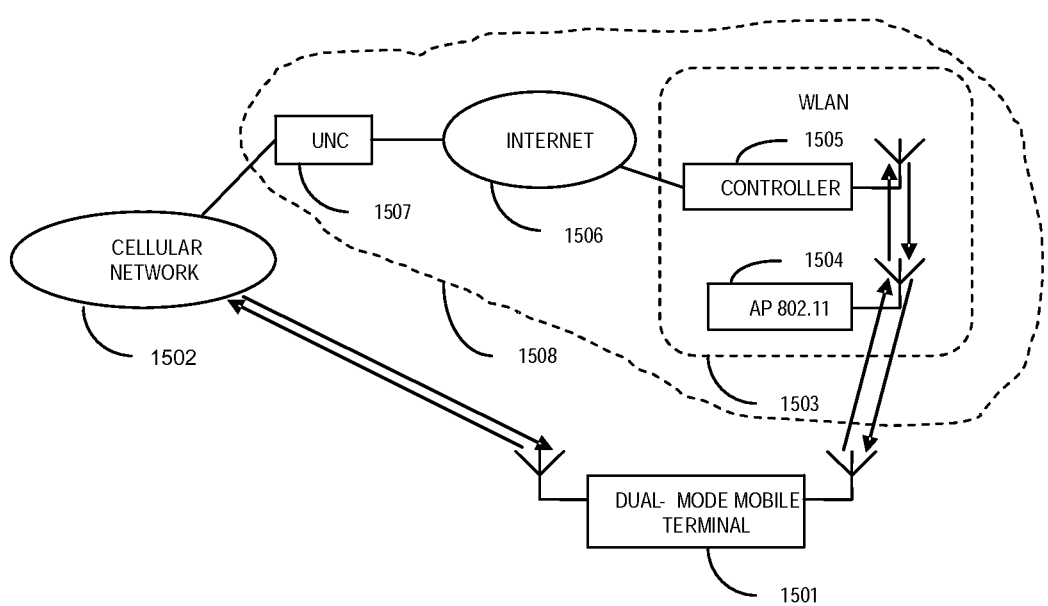

FIGS. 16 and 17 show alternative architectures of the example embodiment shown in FIG. 15. One difference between the architecture of FIG. 15 and the alternative architectures of FIGS. 16 and 17 is how the access point 1504 and the controller 1505 communicate with each other. For example, communications may be over a wired network connection (shown in FIG. 15) or a Wi-Fi radio connection (shown in FIGS. 16 and 17). Other types of connections are also possible.

Another difference between the architectures shown is whether the controller 1505 communicates with the cellular network 1502 directly through the internet 1506 (shown in FIGS. 15 and 17) or indirectly through the access point 1504 (shown in FIG. 16).

Figure 18A:
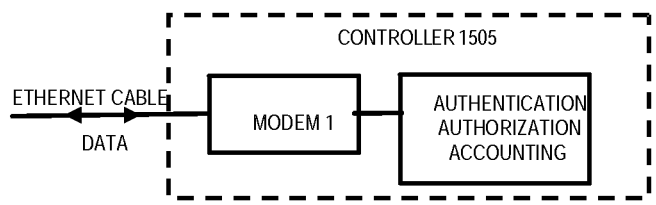
Figure 18B:
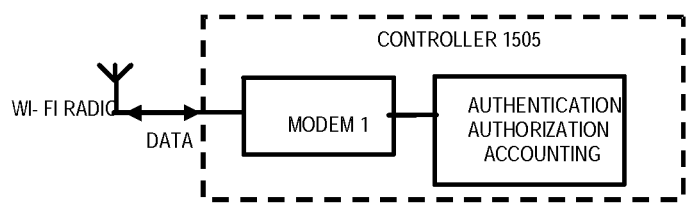
Figure 18C:
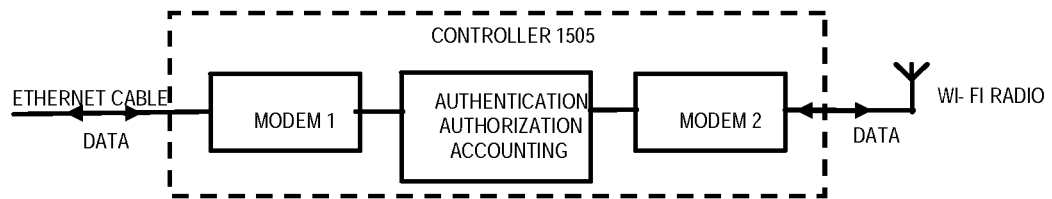

FIGS. 18A-C show the controller 1505 configured differently (e.g., configured with different interfaces) depending on how it communicates with the cellular network 1502 and the access point 1504.

The configurations shown in FIGS. 18A, 18B, and 18C correspond to the controller 1505 of FIGS. 15, 16, and 17, respectively.

Figure 19:
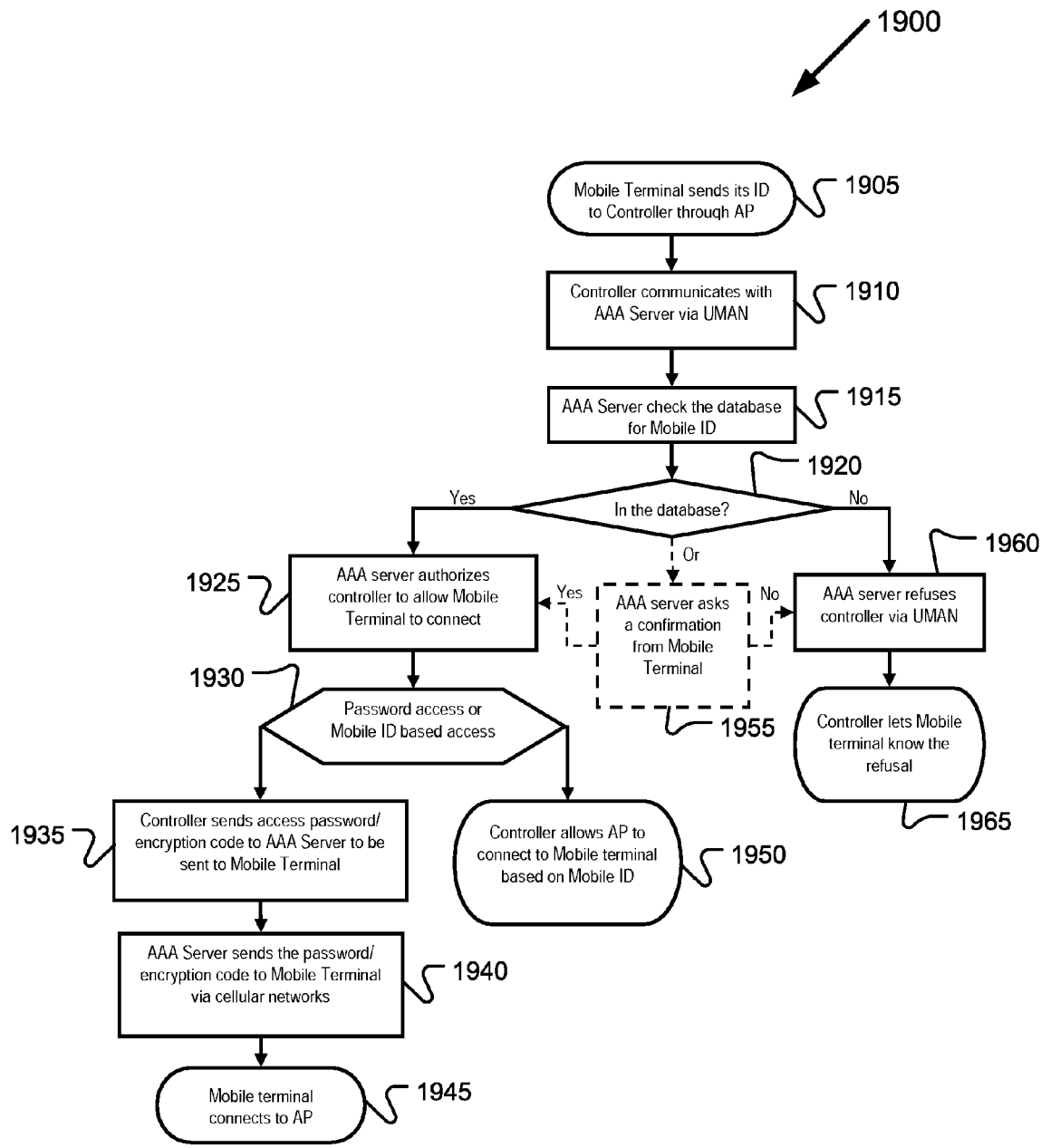

FIG. 19 (in conjunction with FIG. 15) shows a flowchart of an example procedure 1900 in which the controller 1505 contacts the AAA server in the cellular network 1502 for the access of WLAN 1503. In the procedure 1900:

The dual-mode mobile terminal 1501 automatically submits (1905) its identification (e.g., MAC address) to the controller 1505 after it finds a toll WLAN 1503 (e.g., a Wi-Fi access network) and an access point 1504.

The controller 1505 communicates (1910) with the AAA server in the cellular network 1502, via a UMA network (UMAN) 1508, to authenticate the mobile terminal 1501 according to the ID stored in the mobile terminal 1501.

The AAA server in the cellular network 1502 looks (1915) for the information of the incoming mobile terminal 1501 in the subscriber accounts stored in the (HLR).

Optionally, the AAA server sends (1955) a notice to the dual-mode mobile terminal 1501 to confirm its request via the cellular network 1502.

If the AAA server determines (1920) that the information of the incoming mobile terminal 1501 is in the HLR, then the AAA server authorizes (1925) the controller 1505 to connect to the incoming mobile terminal 1501.

However, if the AAA server determines (1920) that the information of the incoming mobile terminal 1501 is not in the HLR, then the AAA server refuses (1960) the controller 1505, via the UMA network (UMAN), authorization to connect to the incoming mobile terminal 1501. The controller 1505 informs (1965) the mobile terminal 1501 that its request for access is denied.

There are two options for the response of the controller 1505 after it receives the authorization from the AAA server (represented at 1930). The controller 1505 sends (1935) a password for access to the access point 1504 to the cellular network 1502 via the UMA network (UMAN) 1508. Then the cellular network 1502 forwards (1940) the password to the mobile terminal 1501 via the cellular network 1502. The mobile terminal 1501 uses (1945) the password to access the WLAN. Alternatively, the controller 1505 directly allows (1950) the mobile terminal 1501 to access the WLAN using the MAC address of the mobile terminal 1501 as a key.

Optionally, the AAA server authorizes the controller 1505 to record the expense, via the UMA network (UMAN), 1508 after receiving the optional confirmation from the mobile terminal 1501 (at 1955).

The controller 1505 sends the expense information to the AAA server in the cellular network 1502, via the UMA network 1508, after the mobile terminal 1501 disconnects the WLAN 1503.

The AAA server in the cellular network 1502 records the expense to the account of mobile terminal 1501. Then the cellular network provider sends the bill, including the cost of the wireless services, to the subscriber of the mobile terminal 1501.

Figure 20:
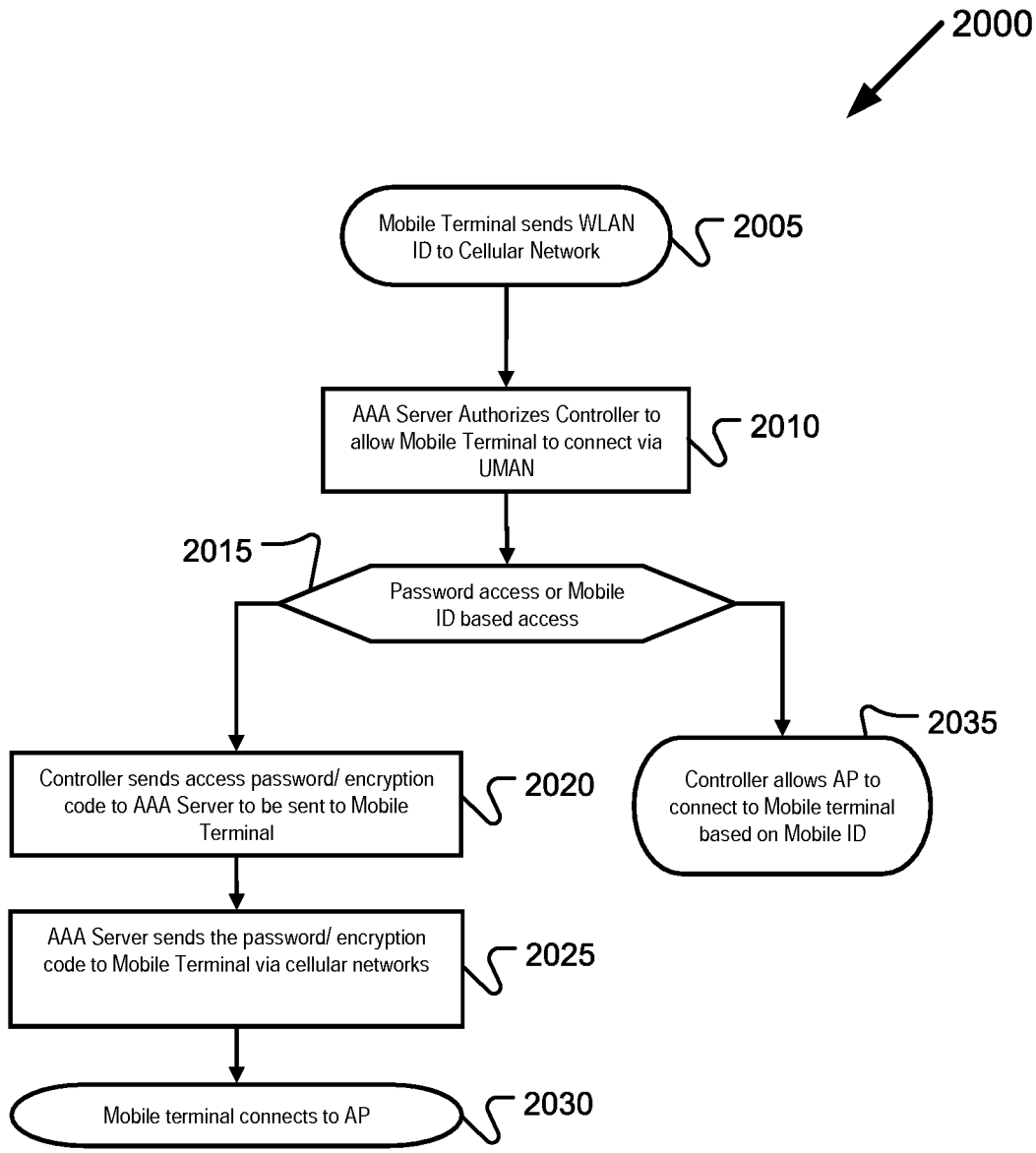

FIG. 20 (in conjunction with FIG. 15) shows a flowchart of an example procedure 2000 in which the mobile terminal 1501 directly contacts the AAA server of the cellular network 1502 requesting access to the WLAN 1503. In the procedure 2000:

After the dual-mode mobile terminal 1501 finds a toll WLAN 1503 and an access point 1504, it submits (2005) the identification of the WLAN 1503 (e.g., the SSID) to the AAA server in the cellular network 1502.

Optionally, the AAA server in the cellular network 1502 sets up communications with the controller 1505 based on its partner information via cellular radio network or UMA network.

The AAA server authorizes (2010) the controller 1505 to connect to the incoming mobile terminal 1501.

There are two options for the response of the controller 1505 after it receives the authorization from the AAA server. The controller 1505 sends (2020) a password to the cellular network 1502 via the UMA network 1508. Then the cellular network 1502 forwards (2025) the password to the mobile terminal 1501. The mobile terminal 1501 uses (2030) the password to access the WLAN. Alternatively, the controller 1505 directly allows (2035) the mobile terminal 1501 to access the WLAN using the MAC address of the mobile terminal 1501 as a key.

Optionally, the AAA server authorizes the controller 1505 to record the expense of the provided wireless service, such as Wi-Fi service.

The controller 1505 sends the expense information to the AAA server after the mobile terminal 1501 disconnects the Wi-Fi network.

The AAA server records the expense to the account of the mobile terminal 1501. Then the cellular network provider sends the bill including the cost of Wi-Fi services to the subscriber of the mobile terminal 1501.

In the illustrated example embodiments, the dual-mode mobile terminal 601 and UMA-enabled dual-mode mobile terminal 1501 may be any device, such as cell phones and notebook computers, with the capability of both cellular network and unlicensed spectrum communications, including Wi-Fi (e.g., IEEE 802.11a/b/g/n and other variants) or Bluetooth (e.g., IEEE 802.15.1 and its variants).

The controller 605 (and 1505) is not limited to a single apparatus. It may be a system comprising multiple devices managing cellular radio, authentication, authorization, and accounting. Some functions of the controller 605 (and 1505) can be integrated into the access point 604 (and 1504). The controller 605 (and 1505) may be software installed in a computer or server. The computer or server is capable of communications with cellular networks.

In the UMA-based architecture of FIG. 15, the controller 1505 is in a WLAN (e.g., a Wi-Fi network) which a WLAN provider owns. However, it is not limited to being in a WLAN network. The controller 1505 can be located in the UNC 1507 or combined together. In this case, the Wi-Fi network is built up and run by a UMA provider. The controller 1505 embedded in the UNC 1507 controls the access point 1504.

The access point 604 (and 1504) is not limited to a single access point. It may be a plurality of access points within the WLAN.

The ID information of the mobile terminal 601 (1501) is not limited to a Media Access Control (MAC) address. It may be other information, such as the information stored on a subscriber identity module (SIM or SIM card) (e.g., the International Mobile Subscriber Identity (IMSI)).

In the example embodiments, the wireless local area network (WLAN) includes a Wi-Fi network (e.g., IEEE 802.11a/b/g/n and other variants) and a wireless personal area network (WPAN) of Bluetooth (e.g., IEEE 802.15.1 and its variants).

Some of the example embodiments mitigate the problem of accessing toll Wi-Fi networks or other wireless local area networks. By providing the mobile terminal 601 (or the UMA-enabled dual-mode mobile terminal 1501) with access to the WLAN 603 as a subscriber to the cellular network 602, for example, customers do not need to pay Wi-Fi service providers directly. A cellular network provider pays Wi-Fi service providers the cost of Wi-Fi services. The cellular network provider then charges its subscribers for the provided Wi-Fi service. By having the cellular network provider pay for Wi-Fi services on behalf of its subscribers, it is convenient for cellular network subscribers who are traveling to use Wi-Fi to access the internet during their journey, for example.

Some of the example embodiments combine, for example, cellular network services with Wi-Fi or other WLAN services and UMA services with Wi-Fi services or other WLAN services.

Some of the example embodiments provide WLAN providers, such as Wi-Fi providers, with an opportunity to increase the number of customers and revenue. For example, many temporary Wi-Fi customers do not like to use their credit card to pay for access to Wi-Fi networks, especially when traveling in an airport, coffee shop or other public area. It is not convenient or safe to input a credit card number over the internet. As a result, the number of potential customers for temporary Wi-Fi services is reduced significantly. Enabling customers to access a WLAN as a subscriber of a cellular network would encourage more to become temporary Wi-Fi customer.

Some of the example embodiments can potentially increase, for example, cellular network or UMA subscribers. Mobile terminals having Wi-Fi functionality, such as cell phones and notebooks, can use, for example, cellular network or UMA services to access toll (or pay for) Wi-Fi networks without using credit cards. Such services can be provided to the customer through monthly payment or prepaid cards.

Some of the example embodiments not only provide customers with the convenience of accessing Wi-Fi networks, but also increase the revenue of both Wi-Fi service providers and, for example, cellular network or UMA providers.

Free (or toll-free) Wi-Fi providers, for example, airports or coffee shops who use the prior art system shown in FIG. 7 can become toll Wi-Fi providers by, for example, using the example embodiment shown in FIG. 6. This would generate revenue for these Wi-Fi providers. At the same time, the number of Wi-Fi customer would increase because there are more cellular network subscribers with dual-mode mobile terminals, and thus potential new Wi-Fi customers. These new customers would not be customer but for the Wi-Fi providers using the example embodiment shown in FIG. 6.

By adopting the procedures provided in the example embodiments (e.g., the procedure 200 of FIG. 2A), WLAN providers do not have to do their own marketing. They can take advantage of a much stronger market presence (and larger marketing budgets) of cellular network or UMA service providers.

Some of the example embodiments enable cellular network and UMA service providers to benefit from toll Wi-Fi customers becoming subscribers of a cellular network.

Some of the example embodiments enable customers of a cellular network service or UMA service to benefit by being able to access both free and toll Wi-Fi networks conveniently (e.g., by using a common access method or procedure).

It should be understood that the block, flow, and network diagrams may include more or fewer elements, be arranged differently, or be represented differently. It should be understood that implementation may dictate the diagrams and the number of diagrams illustrating the execution of embodiments of the invention.

It should be understood that elements of the block, flow, and network diagrams described above may be implemented in software, hardware, or firmware. In addition, the elements of the diagrams described above may be combined or divided in any manner in software, hardware, or firmware. If implemented in software, the software may be written in any language that can support the embodiments disclosed herein. The software may be stored on any form of computer readable medium, such as random access memory (RAM), read only memory (ROM), compact disk read only memory (CD-ROM), and other non-transitory medium. In operation, a general purpose or application specific processor loads and executes the software in a manner well understood in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A method for providing a multimode mobile terminal with access to a wireless local area network, the mobile terminal being capable of switching among, at least, cellular and wireless modes and corresponding to a subscriber of a cellular network, the wireless local area network and cellular network each being managed by a separate entity, the method comprising:

identifying the mobile terminal and the wireless local area network from a request by the mobile terminal for access to the wireless local area network, the request comprising information which identifies the wireless local area network;

based on the identifying, authorizing a controller of the wireless local area network to provide the mobile terminal with access to the wireless local area network as a subscriber of the cellular network, the controller of the wireless local area network being responsible for at least accounting for the wireless local area network to record an expense for providing the mobile terminal with access to the wireless local area network;

providing the mobile terminal with access to the wireless local area network as authorized, and the identifying, authorizing, and providing being carried out by electronic processing in at least one electronic component or module.

2. The method of claim 1 wherein identifying the mobile terminal and wireless local area network includes identifying the mobile terminal and the wireless local area network from the request sent from the mobile terminal through the wireless local area network to the cellular network.

3. The method of claim 2 wherein the request is sent through the wireless local area network to the cellular network over a cellular radio connection.

4. The method of claim 2 wherein the request is sent through the wireless local area network to the cellular network over a wired network.

5. The method of claim 2 wherein the request is sent through the wireless local area network to the cellular network over Internet.

6. The method of claim 2 wherein identifying the mobile terminal includes authenticating an identification submitted in the request.

7. The method of claim 1 wherein identifying the mobile terminal and the wireless local area network includes identifying the wireless local area network from a request sent from the mobile terminal directly to the cellular network.

8. The method of claim 7 wherein the request is sent from the mobile terminal to the cellular network over a cellular radio connection.

9. The method of claim 7 wherein identifying the wireless local area network includes identifying the wireless local area network based on a wireless local area network identification submitted in the request.

10. The method of claim 9 wherein identifying the wireless local area network includes determining whether the wireless local area network and the cellular network are partners based on the wireless local area network identification.

11. The method of claim 1 wherein authorizing the wireless local area network includes authorizing an access point of the wireless local area network to provide the mobile terminal with access to the wireless local area network.

12. The method of claim 1 wherein providing the mobile terminal with access to the wireless local area network includes sending a password to the mobile terminal through the cellular network, the password being sent is used by the mobile terminal to access the wireless local area network through an access point.

13. The method of claim 1 wherein providing the mobile terminal with access to the wireless local area network includes allowing the mobile terminal to access the wireless local area network through an access point using a mobile terminal identifier as a key.

14. The method of claim 1 further comprising in response to the request from the mobile terminal, requesting the mobile terminal to confirm the request;

and wherein authorizing the wireless local area network includes in response to the mobile terminal confirming the request, authorizing the wireless local area network to provide the mobile terminal with access to the wireless local area network.

15. The method of claim 1 further comprising:

authorizing the wireless local area network to record the expense for providing the mobile terminal with access to the wireless local area network;

adding an amount to an account of the mobile terminal in the cellular network based on the recorded expense received from the wireless local area network; and billing the amount to the mobile terminal.

16. The method of claim 1 wherein the controller of the wireless local area network is further responsible for authentication and authorization for the wireless local area network.

17. A method performed by a cellular network for providing a multimode mobile terminal with access to a wireless local area network, the mobile terminal being capable of switching among, at least, cellular and wireless modes and corresponding to a subscriber of the cellular network, the wireless local area network and cellular network each being managed by a separate entity, the method comprising:

the cellular network identifying the mobile terminal and the wireless local area network from a request by the mobile terminal for access to the wireless local area network, the request comprising information which identifies the wireless local area network; and based on the identifying, the cellular network authorizing a controller of the wireless local area network to provide the mobile terminal with access to the wireless local area network as a subscriber of the cellular network, the controller of the wireless local area network being responsible for at least accounting for the wireless local area network to record an expense for providing the mobile terminal with access to the wireless local area network.

18. The method of 17 wherein identifying the mobile terminal and wireless local area network includes the cellular network identifying the mobile terminal and wireless local area network from the request sent from the mobile terminal through the wireless local area network to the cellular network.

19. The method of 17 wherein identifying the mobile terminal and the wireless local area network includes the cellular network identifying the wireless local area network from a request sent from the mobile terminal directly to the cellular network.

20. A method comprising:
providing cellular service from a cellular network to a multimode mobile terminal, the mobile terminal being capable of switching among, at least, cellular and wireless modes;
providing authorization from the cellular network to a controller of the wireless local area network to enable communication between the wireless local area network and the mobile terminal, the controller of the wireless local area network being responsible for at least accounting for the wireless local area network to record an expense for providing the mobile terminal with access to the wireless local area network; and
wherein each network is managed by a separate entity.

21. The method of claim 20 wherein providing authorization includes identifying the mobile terminal and the wireless local area network from a request sent from the mobile terminal through the wireless local area network to the cellular network.

22. The method of claim 20 wherein providing authorization includes identifying the wireless local area network from a request sent from the mobile terminal directly to the cellular network.

23. A method performed by a wireless local area network for providing a multimode mobile terminal with access to the wireless local area network, the mobile terminal being capable of switching among, at least, cellular and wireless modes and corresponding to a subscriber of a cellular network, the wireless local area network and cellular network each network being managed by a separate entity, the method comprising:
receiving authorization from the cellular network to provide the mobile terminal with access to the wireless local area network as a subscriber of the cellular network, the authorization being received by a controller of the wireless local area network that is responsible for at least accounting for the wireless local area network to record an expense for providing the mobile terminal with access to the wireless local area network; and
providing the mobile terminal with access to the wireless local area network as authorized.

24. The method of claim 23 further comprising:
the wireless local area network requesting the cellular network to identify the mobile terminal from a request received from the mobile terminal for access to the wireless local area network, the request comprising information which identifies the wireless local area network; and
the wireless local area network requesting the cellular network to authorize the wireless local area network to provide the identified mobile terminal with access to the wireless local area network.

25. A method performed by a cellular network and wireless local area network for providing a multimode mobile terminal with access to the wireless local area network, the mobile terminal being capable of switching among, at least, cellular and wireless modes and corresponding to a subscriber of a cellular network, the wireless local area network and cellular network each being managed by a separate entity, the method comprising:
the cellular network identifying the mobile terminal and the wireless local area network from a request by the mobile terminal for access to the wireless local area network, the request comprising information which identifies the wireless local area network;
based on the identifying, the cellular network authorizing a controller of the wireless local area network to provide the mobile terminal with access to the wireless local area network as a subscriber of the cellular network, the controller of the wireless local area network being responsible for at least accounting for the wireless local area network to record an expense for providing the mobile terminal with access to the wireless local area network; and
the wireless local area network providing the mobile terminal with access to the wireless local area network as authorized.

26. The method of 25 wherein identifying the mobile terminal and wireless local area network includes the cellular network identifying the mobile terminal and wireless local area network from a request sent from the mobile terminal through the wireless local area network to the cellular network.

27. The method of 25 wherein identifying the mobile terminal and the wireless local area network includes the cellular network identifying the wireless local area network from a request sent from the mobile terminal directly to the cellular network.

28. A method performed by a cellular network and multimode mobile terminal, the mobile terminal being capable of switching among, at least, cellular and wireless modes and corresponding to a subscriber of the cellular network, the wireless local area network and cellular network each being managed by a separate entity, the method comprising:
the mobile terminal requesting access to the wireless local area network;
the cellular network identifying the mobile terminal and the wireless local area network from a request by the mobile terminal, the request comprising information which identifies the wireless local area network;
based on the identifying, the cellular network authorizing a controller of the wireless local area network to provide the mobile terminal with access to the wireless local area network as a subscriber of the cellular network, the controller of the wireless local area network being responsible for at least accounting for the wireless local area network to record an expense for providing the mobile terminal with access to the wireless local area network; and
the mobile terminal accessing the wireless local area network.

29. The method of claim 28 wherein requesting access to the wireless local area network includes the mobile terminal submitting a request with the identity of the mobile terminal and wireless local area network through the wireless local area network to the cellular network.

30. The method of claim 28 wherein requesting access to the wireless local area network includes the mobile terminal submitting a request with the identity of the wireless local area network directly to the cellular network.

31. An apparatus in a cellular network to provide a multimode mobile terminal with access to a wireless local area network, the mobile terminal being capable of switching among, at least, cellular and wireless modes and corresponding to a subscriber of the cellular network, the wireless local area network and cellular network each being managed by a separate entity, the apparatus comprising:
an identifying module to identify the mobile terminal and the wireless local area network from a request by the mobile terminal for access to the wireless local area network, the request comprising information which identifies the wireless local area network; and an authorizing module communicatively coupled to the identifying module to authorize a controller of the wireless local area network to provide the mobile terminal with access to the wireless local area network as a subscriber of the cellular network based on identifying the mobile terminal and the wireless local area network, and the controller of the wireless local area network being responsible for at least accounting for the wireless local area network to record an expense for providing the mobile terminal with access to the wireless local area network.

32. The apparatus of claim 31 wherein the identifying module is configured to identify the mobile terminal and wireless local area network from a request sent from the mobile terminal through the wireless local area network to the cellular network.

33. The apparatus of claim 31 wherein the identifying module is configured to identify the wireless local area network from a request sent from the mobile terminal directly to the cellular network.

34. A computer program product comprising a nontransitory computer readable medium having stored thereon a computer readable program, the computer readable program when loaded into a computer processor of a node in a wireless local area network, transforms the computer processor into a programmed computer processor and when executed causes the programmed computer processor to:

receive authorization from a cellular network to provide a multimode mobile terminal with access to the wireless local area network, the mobile terminal being capable of switching among, at least, cellular and wireless modes and corresponding to a subscriber of the cellular network, the cellular network being managed by an entity separate from one managing the wireless local area network;

provide the mobile terminal with access to the wireless local area network as a subscriber of the cellular network; and provide accounting for the wireless local area network to record an expense, in a controller of the wireless local area network, for providing the mobile terminal with access to the wireless local area network in a controller of the wireless local area network.

35. The computer program product of claim 34 wherein authorization is received by the computer processor over the cellular network.

36. The method of claim 34 wherein authorization is received by the computer processor over an internet network.

37. A cellular network node to provide a multimode mobile terminal with access to a wireless local area network, the mobile terminal being capable of switching among, at least, cellular and wireless modes and corresponding to a subscriber of a cellular network, the wireless local area network and cellular network each being managed by a separate entity, the node comprising:

a transceiver configured to transmit and receive cellular communications with the mobile terminal; and a processor communicatively coupled to the wireless local area network programmed to:

identify the mobile terminal and the wireless local area network from a request for access received by the processor and the request comprising information which identifies the wireless local area network; and authorize a controller of the wireless local area network to provide the mobile terminal with access to the wireless local area network as a subscriber of the cellular network based on identifying the mobile terminal and the wireless local area network, the controller of the wireless local area network being responsible for at least accounting for the wireless local area network to record an expense for providing the mobile terminal with access to the wireless local area network.

* * * * *